United States Patent

Mukai et al.

[11] Patent Number: 5,771,416
[45] Date of Patent: Jun. 23, 1998

[54] CAMERA HAVING SIMPLE AND INEXPENSIVE FINDER FIELD FRAME SWITCHING MECHANISM

[75] Inventors: Hiromu Mukai, Kawachinagano; Kyoichi Miyazaki, Izumiotsu; Hideki Nagata, Sakai, all of Japan

[73] Assignee: Minolta Co., Ltd., Osaka, Japan

[21] Appl. No.: 790,619

[22] Filed: Jan. 29, 1997

[30] Foreign Application Priority Data

| Jan. 30, 1996 | [JP] | Japan | 8-014697 |
| Jan. 30, 1996 | [JP] | Japan | 8-014699 |
| Jan. 30, 1996 | [JP] | Japan | 8-014700 |
| Jan. 31, 1996 | [JP] | Japan | 8-015400 |
| Jan. 31, 1996 | [JP] | Japan | 8-015401 |

[51] Int. Cl.⁶ .................................................. G03B 13/10
[52] U.S. Cl. ........................................ 396/378; 396/380
[58] Field of Search ............................... 396/378, 379, 396/380, 381

[56] References Cited

U.S. PATENT DOCUMENTS

| 3,034,394 | 5/1962 | Lange | 396/380 |
| 4,639,111 | 1/1987 | Harvey | 396/378 |
| 4,652,104 | 3/1987 | Harvey | 396/378 |
| 5,410,381 | 4/1995 | Kameyama et al. | 354/222 |
| 5,565,948 | 10/1996 | Kume et al. | 396/378 |
| 5,617,170 | 4/1997 | Watanabe et al. | 396/378 |

FOREIGN PATENT DOCUMENTS

| 54-026721 | 2/1979 | Japan . |
| 4-3430 | 1/1992 | Japan . |
| 5-34806 | 2/1993 | Japan . |
| 5-281596 | 10/1993 | Japan . |

Primary Examiner—Russell E. Adams
Attorney, Agent, or Firm—McDermott, Will & Emery

[57] ABSTRACT

A finder has a finder field frame switching mechanism for switching and indicating two field frames relative to a reference field frame. The finder field frame switching mechanism performs switching of one field frame by a mechanical type switching mechanism, and switching of another field frame by liquid crystal. As a result, an inexpensive finder field frame switching mechanism of a simple structure can be provided.

12 Claims, 61 Drawing Sheets

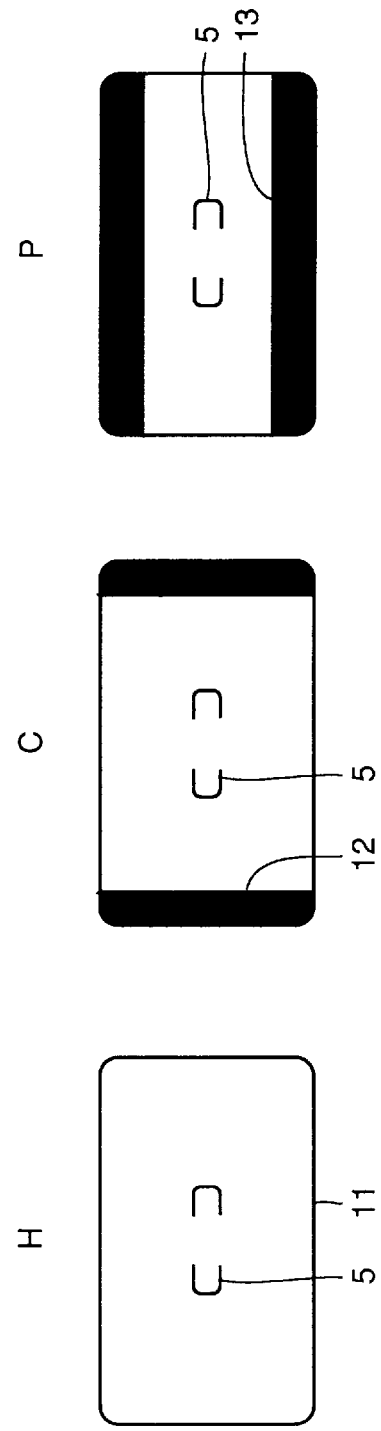

C

H

P

OBJECT SIDE — SIDE OF EYE

OBJECT SIDE — SIDE OF EYE

CAMERA HAVING SIMPLE AND INEXPENSIVE FINDER FIELD FRAME SWITCHING MECHANISM

BACKGROUND OF THE INVENTION

1. Field of the Invention

The present invention relates generally to finders, and more particularly to a finder for use in a camera such as still film camera, movie film camera, still video camera and movie video camera.

2. Description of the Related Art

Cameras capable of switching among a number of photographing formats have been known. A known method of switching a photographing format includes switching the size of an image transferred onto a recording medium by restricting the optical path of a photographing optics, and recording data indicating a photographing format separately from an image without changing the size of the image transferred onto the recording medium. According to the latter switching method, only the region of image transferred onto the recording medium which corresponds to the photographing format recorded as data is reproduced upon reproducing the image by printing the film image, in order to switch the photographing format. Such a camera capable of switching a photographing format is desirably capable of switching the field frame of the finder according to each photographing format. Among such cameras, some indicate a field frame corresponding to a first photographing format having a maximum area in a fixed manner, while switchably indicate a field frame between second and third photographing formats using a mechanical switching mechanism.

However, in such a conventional camera, the field frame is switched between the field frame corresponding to the photographing format of the maximum area and the field frames for the other two photographing formats using the switching mechanism, the mechanism is complicated, resulting in an increased cost for the finder mechanism as well as complication of the entire system.

SUMMARY OF THE INVENTION

It is therefore an object of the invention to provide an inexpensive finder field frame switching mechanism.

Another object of the invention is to provide a finder field frame switching mechanism of a simple structure.

Yet another object of the invention is to provide a finder field frame switching mechanism having a switching mechanism other than mechanical type.

The above-described objects of the invention are achieved by a finder including the following elements.

More specifically, a finder capable of switching the field frame between two field frames relative to a reference field frame according to the present invention switches the field frame to one of the two field frames by a mechanical type switching mechanism, and to the other field frame using a liquid crystal.

The field frame is switched to one of the two field frames using a mechanical type switching mechanism and to the other field frame by means of liquid crystal, and the switching among the three finder field frames can be achieved using a single mechanical type switching mechanism and inexpensive liquid crystal with a reduced number of segments without using a complicated mechanical type switching mechanism or expensive liquid crystal with a larger number of segments. As a result, a finder having an inexpensive finder field frame switching mechanism can be provided.

According to another aspect of the invention, the finder includes a first field frame member for indicating a first field frame as a reference field frame, a second field frame member of a mechanical type which can be advanced/withdrawn in an optical path for indicating a second field frame smaller in area than the first field frame, and a third field frame member of a liquid crystal type provided in an optical path in a fixed manner for indicating a third field frame having a lengthwise width smaller than the first and second field frames.

The field frame is switched from the reference field frame to the third field frame of the smallest lengthwise width using liquid crystal, and to the intermediate second field frame by a mechanical method. As a result, a finder having a field frame switching mechanism of a simple structure can be provided, because the switching is not entirely performed mechanically.

According to yet another aspect of the invention, a camera includes a photographing optics for photographing an object image onto a recording medium, and a finder for viewing the object image. The camera is capable of switching the photographing format of the photographing optics among a first format, a second format having a longer transverse width and a lengthwise width identical to the first format, and a third format having a transverse width longer than and a lengthwise width shorter than the first format. The finder includes a first field frame member for indicating a first field frame corresponding to the first format as a reference field frame, a second field frame member of a mechanical type which can be advanced/withdrawn in the optical path of the finder for indicating a second field frame corresponding to the second format, and a third field frame member of liquid crystal type fixed in the optical path of the finder for indicating a third field frame corresponding to the third format.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6A to 6C are views how the finder image looks by the function of a switching mechanism according to one embodiment of the invention;

DESCRIPTION OF THE PREFERRED EMBODIMENTS

Now, a still film camera according to embodiments of the invention will be described in conjunction with the accompanying drawings.

(1) First Embodiment

The camera according to this embodiment includes photographing formats as follows:

a high vision type (hereinafter referred to as H format) of an aspect ratio of 9:16 and a maximum area, a classic type (hereinafter referred to as C format) having a lengthwise width identical to the H format and a transverse width shorter than the H format with an aspect ratio of 2:3, and a panoramic type (hereinafter referred to as P format) having a transverse width identical to and a lengthwise width shorter than the H format with an aspect ratio of 1:3.

Among these three photographing formats, the H format has the largest area, the H format and C format are identical in lengthwise width, and the H format and P format are identical in transverse width. More specifically, the C format is produced by narrowing the transverse width of the H format, while the P format is produced by narrowing the lengthwise width of the H format, in other words the H format is used as a reference.

Using H format as a reference field frame, the finder may switch the field frame by using a mask material and indexes of marking lines for the C and P formats.

Meanwhile, the reference field frame of a finder does not have to be the H format, and the H and P formats may be indicated using indexes by a mask member or marking lines, using the C format as a reference field frame. In this case, however, since the H and P formats are larger than the C format transversely, the magnification of the finder image must be changed to the wide angle side for indication upon indicating the H and P formats.

Figure 1:
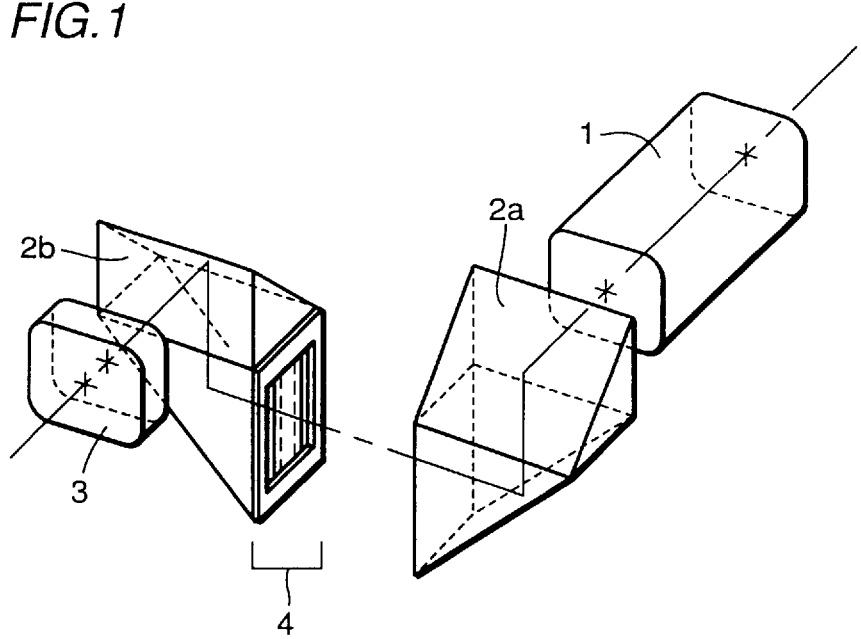
FIG. 1 is an overall view showing a finder.

FIG. 1 is a view showing the entire finder. A luminous flux refracted by an objective optics 1 forms an image near a field frame switching mechanism 4. The image is an inverted image, and therefore formed into an erected image by the function of inverting optics (2a, 2b). The image is enlarged by an eyepiece optic 3 for observation. At the time, the image of an object may be observed in a field frame corresponding to any of the three kinds of formats using finder field frame switching mechanism 4.

A field frame switching mechanism for switching the field frame among the H format, C format and P format may take various forms. Various forms of the mechanism will be listed below.

FIGS. 2 to 11 show how finder fields look with and without field frame switching mechanisms. FIGS. 2 to 6 show how the finder field looks by a field frame switching mechanism using the HI format as a reference field frame. A distance measuring frame 5 is provided in any of the figures.

Figure 2:
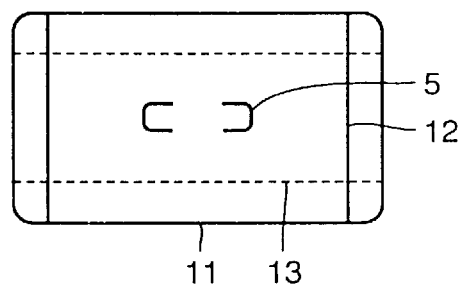
FIGS. 2 to 5C are views showing how the finder image looks by the function of a switching mechanism.

FIG. 2 shows how the finder field looks if there is no field frame switching mechanism for indicating C and P formats, in which a C format field frame 12 and a P format field frame 13 are indicated by marking lines in an H format field frame 11 as a reference field frame.

Figure 3A:
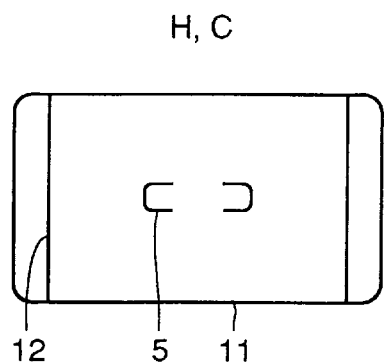
Figure 3B:
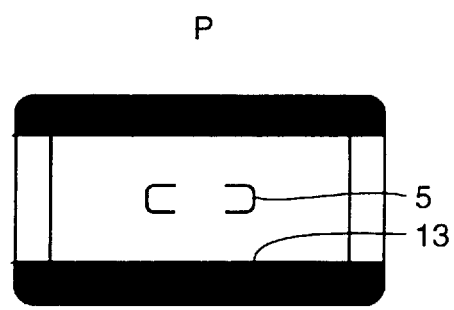

FIGS. 3A and 3B shows how the finder field looks if there is only a field frame switching mechanism for the P format without one for the C format. C format field frame 12 is indicated by marking lines in H format field frame 11. P format field frame 13 is indicated by shielding upper and lower portions of H format field frame 11 using a light shielding member.

Figure 4A:
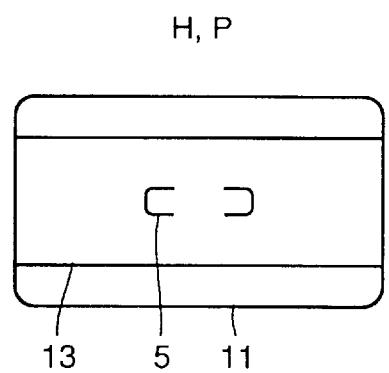
Figure 4B:
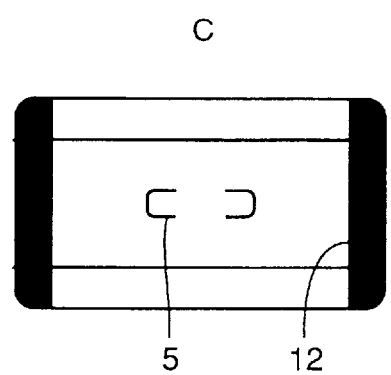

FIGS. 4A and 4B show how the finder field looks if there is only a field frame switching mechanism for the C format without one for the P format. P format field frame 13 is indicated by marking lines in H format field frame 11. C format field frame 12 is indicated by shielding right and left portions of H format field frame 11 using a light shielding member.

Figure 5A:
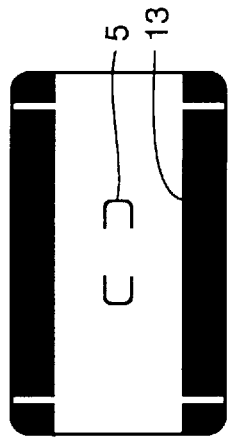
Figure 5B:
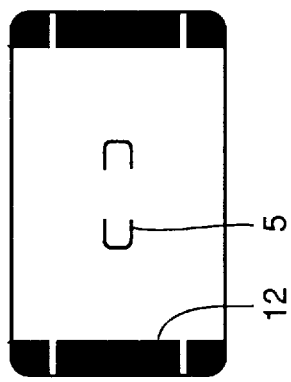
Figure 5C:
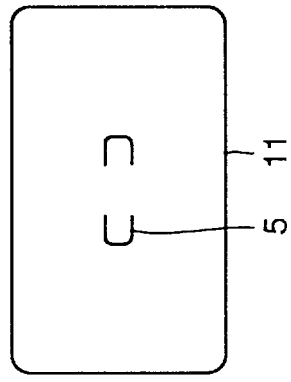

FIGS. 5A to 5C show how the finder field looks if there are provided field frame switching mechanisms for indicating the C and P formats. C format field frame 12 is indicated by shielding light upon left and right portions of H format field frame 11, while upper and lower portions of H format field frame 11 are shielded from incident light, so that P format field frame 13 is indicated. An unshielded portion is essentially created to such a field frame switching mechanism, and switching of the field frame can be sufficiently visually recognized.

FIGS. 6A to 6C show how the finder field looks if there are provided field frame switching mechanisms for indicating the C and P formats. Right and left portions of H format field frame 11 are shielded from incident light to indicate C format field frame 12, while upper and lower portions of H format field frame 11 are shielded from incident light to indicate P format field frame 13. In FIGS. 5A to 5C, there is no unshielded portion.

FIGS. 7 to 11 show how the finder field looks by the function of a field frame switching mechanism using the C format as a reference field frame. There is a distance measuring frame 5 in any of the figures. If the C format is used as a reference field frame, since the H and P formats are larger than the C format in transverse width, a finder image is magnified into wide angles upon indicating the H and P formats.

Figure 7:
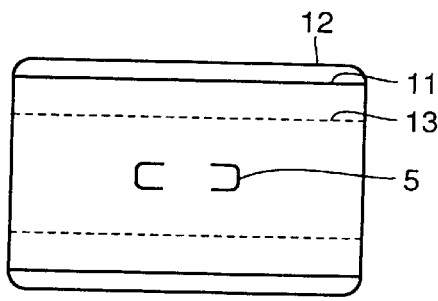
FIGS. 7 to 11C are views showing how the finder image looks by the function of a switching mechanism.

FIG. 7 shows the case in which there is no field frame switching mechanism for indicating the H and P formats, in which H format field frame 11 and P format field frame 13 are indicated by marking lines within C format field frame 13 as a reference field frame.

Figure 8A:
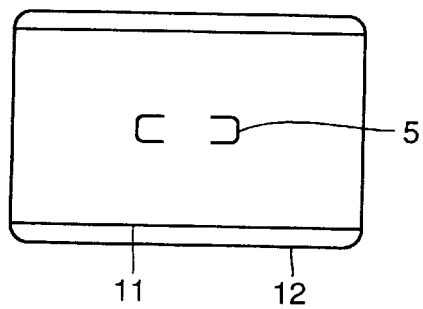
Figure 8B:
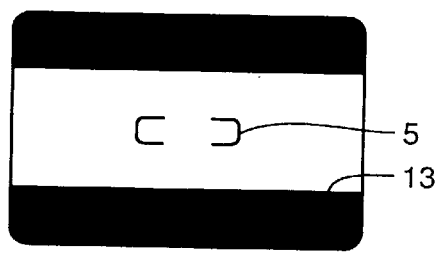

FIGS. 8A and 8B show how the finder field looks if there is a field frame switching mechanism only for the P format without any field frame switching mechanism for indicating the H format. In C format field frame 12, H format field frame 11 is indicated by marking lines. P format field frame 13 is indicated by shielding upper and lower portions of C format field frame 12 from light using a light shielding member. H format field frame 11 is hidden P format field frame 13.

Figure 9A:
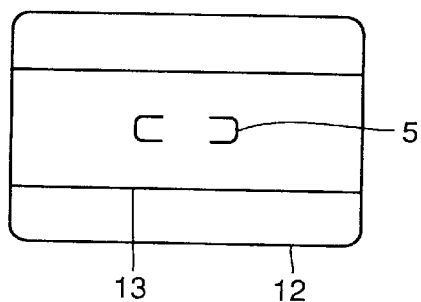
Figure 9B:
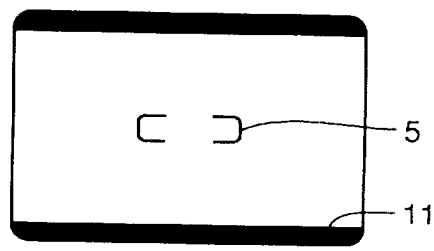

FIGS. 9A and 9B show how the finder field looks if there is a field frame switching mechanism only for the H format without any field frame switching mechanism for indicating the P format. P format field frame 13 is indicated by marking lines in C format field frame 12. H format field frame 11 is indicated by shielding upper and lower portions of C format field frame 12 from light using a light shielding member. In the H format, P format field frame 13 is not hidden.

Figure 10A:
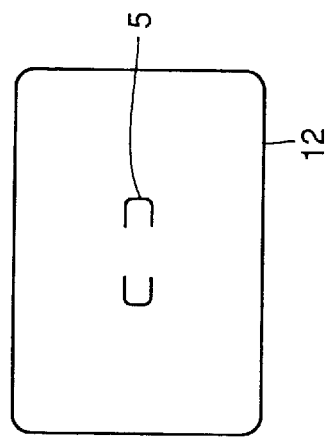
Figure 10B:
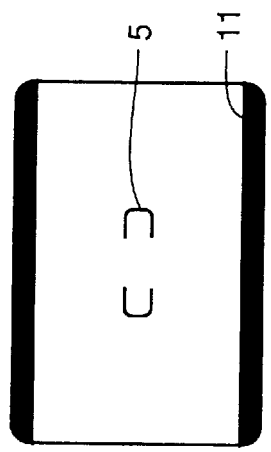
Figure 10C:
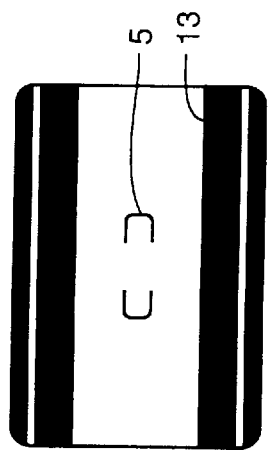

FIGS. 10A to 10C show how the finder field looks if there are field frame switching mechanisms for indicating the H and P formats. H format field frame 11 is indicated by shielding upper and lower portions of C format field frame 12 from incident light. P format field frame 12 is indicated by shielding upper and lower portions of C format field frame 12 in a range wider than the case of H format field frame 11. An unshielded portion is created essentially to the field frame switch mechanisms, and the switching of the field frame can be sufficiently visually recognized.

Figure 11A:
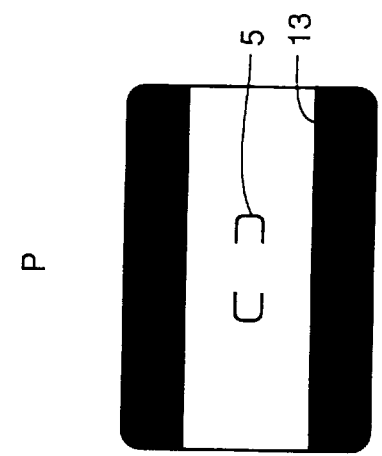
Figure 11B:
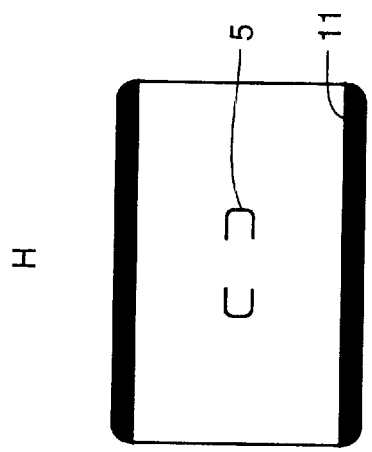
Figure 11C:
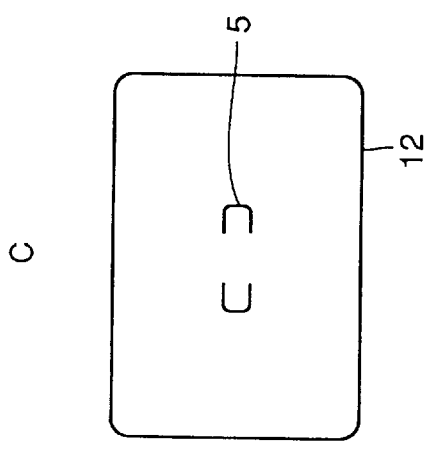

FIGS. 11A to 11C show how the finder field looks if there are field frame switching mechanisms for indicating the C and P formats. H format field frame 11 is indicated by shielding upper and lower portions of C format field frame 12. P format field frame 13 is indicated by shielding upper and lower portions of C format field frame 12 in a range wider than the case of H format field frame 11. No unshielded portion is created as opposed to FIGS. 10A to 10C.

FIGS. 12 to 61 are views schematically showing specific field frame switching mechanisms.

Figure 12:
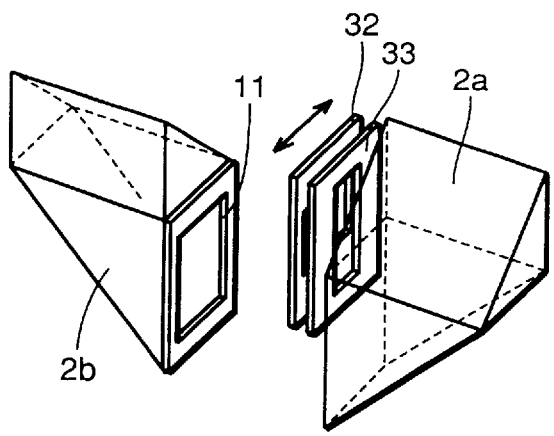
FIGS. 12 to 14 are views each showing a conventional field frame switching mechanism.
Figure 13:
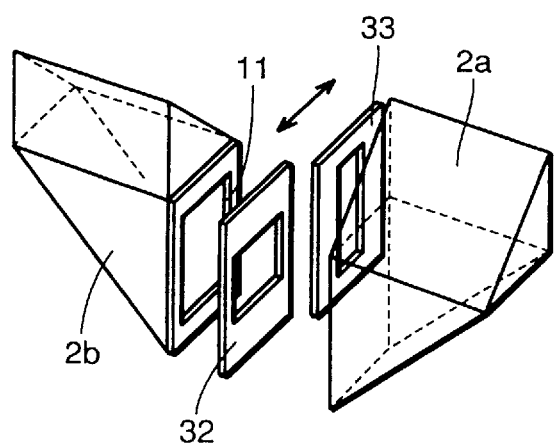
Figure 14:
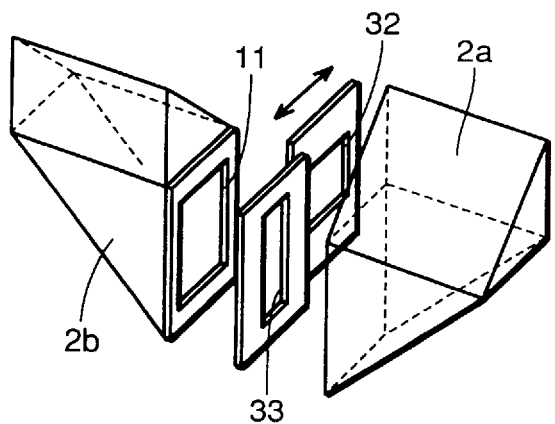

FIGS. 12 to 14 represent a conventional type according to which the H format is used as a reference field frame, and the field frame is switched among the reference field frame and the C and P formats using a mechanical type switching mechanism. FIG. 13 shows the case in which the H format field frame as a reference field frame is indicated. FIG. 13 shows the case in which the C format field frame is indicated, when a mask member 32 as a C format field frame member is entered. FIG. 14 shows the case in which the P format field frame is indicated when a mask member 33 as a P format field frame member is entered. This switching mechanism requires mask members 32 and 33 to move for a long distance and therefore cannot be reduced in size. How the finder field looks in this case is shown in FIGS. 6A to 6C.

Figure 15:
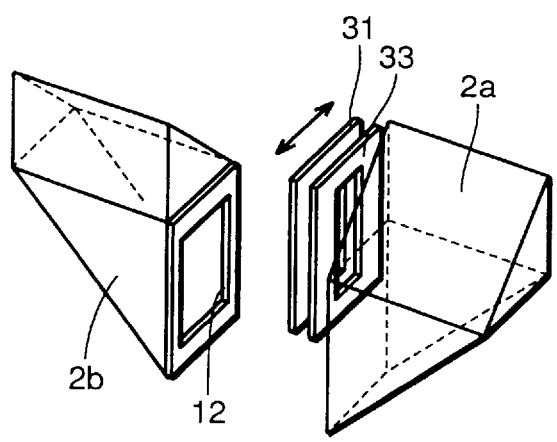
FIGS. 15 to 17 are views each showing a field frame switching mechanism.
Figure 16:
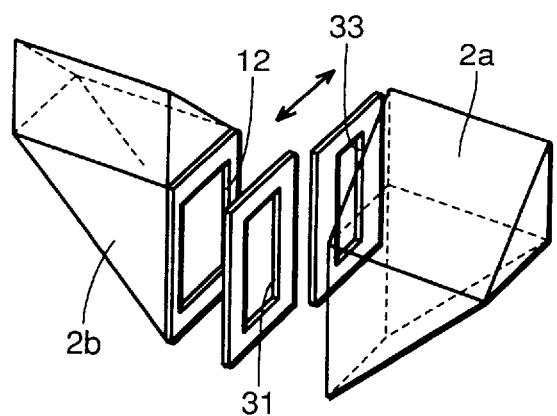
Figure 17:
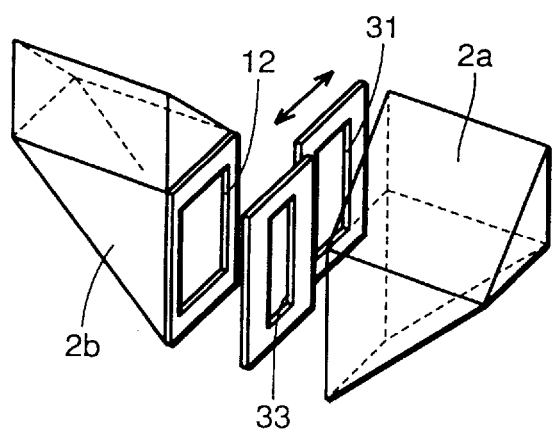
Figure 62:
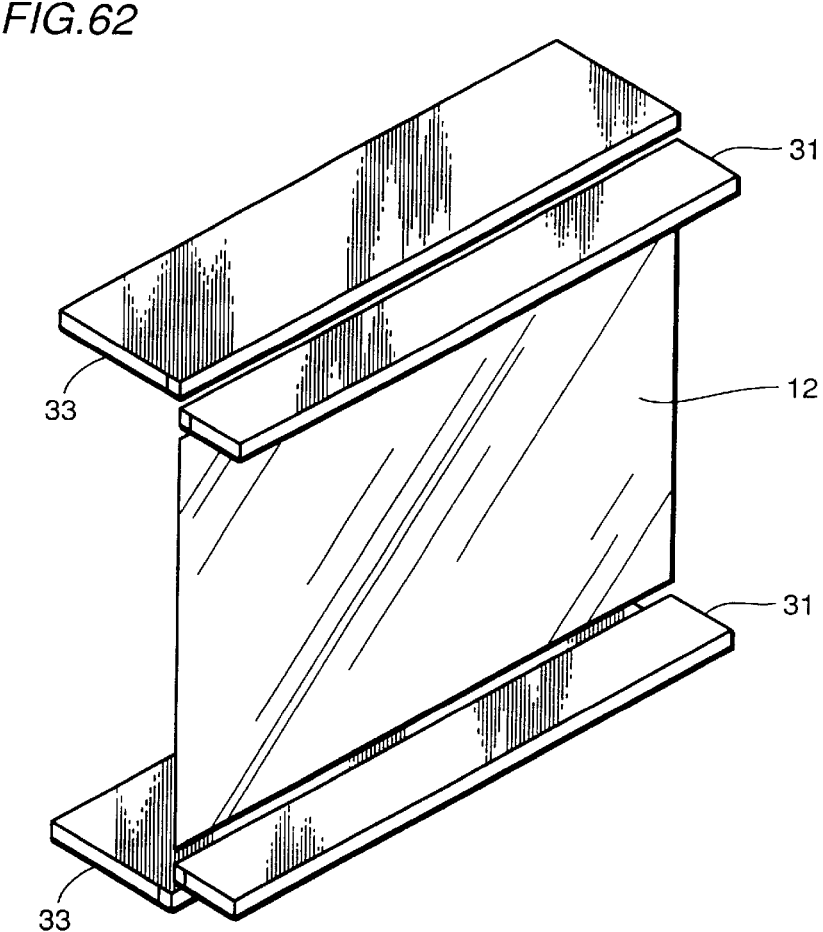
FIG. 62 is a view showing a field frame switching mechanism of a mechanical type using a C format as reference.

FIGS. 15 to 17 show a type according to which a mask member is used to switch the field frame among the C format as a reference field frame, the H and P formats. FIG. 15 shows the case in which the C format field frame as a reference field frame is indicated. FIG. 16 shows the case in which the H format field frame is indicated when a mask member 31 as an H format field frame member is entered. FIG. 17 shows the case in which the P format field frame is indicated when a P format mask member 33 is entered. The switching mechanism requires a large amount of movement of mask members 31 and 33, and cannot be much reduced in size. However, both for indicating the H format field frame and the P format field frame, the field is shielded in the same direction, the mechanism allows much easier designing and can be smaller in size than the case shown in FIGS. 12 to 14. This is shown in FIGS. 62 and 64. FIG. 11 shows how the finder field looks in this case.

Figure 18:
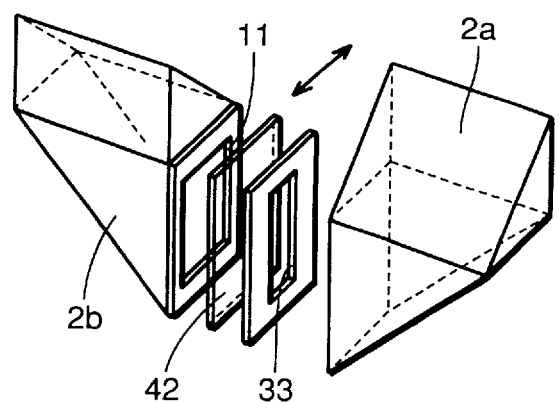
FIGS. 18 and 19 are views showing a field frame switching mechanism according to a first embodiment of the invention.
Figure 19:
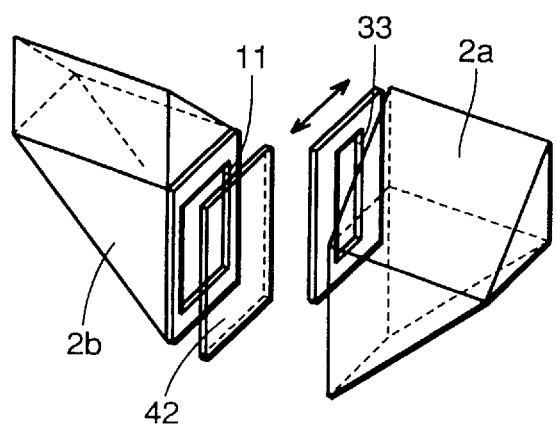

In FIGS. 18 and 19, using the H format as a reference field frame, the C format is indicated by liquid crystal 42 as a C format field frame member, and the P format is indicated when a P format mask member 33 is entered. FIG. 18 shows the case in which the P format field frame is indicated. FIG. 19 shows the C format field frame. In this case, only one field frame member needs to be moved, and therefore the mechanism can be reduced in size. FIGS. 6A to 6C show how the finder field looks in this case.

Figure 20:
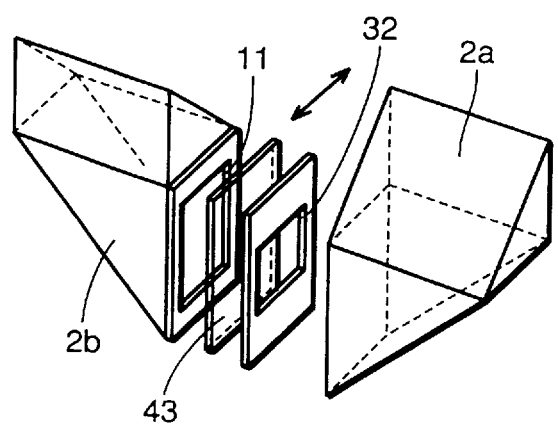
FIGS. 20 and 21 are views showing a field frame switching mechanism according to a second embodiment of the invention.
Figure 21:
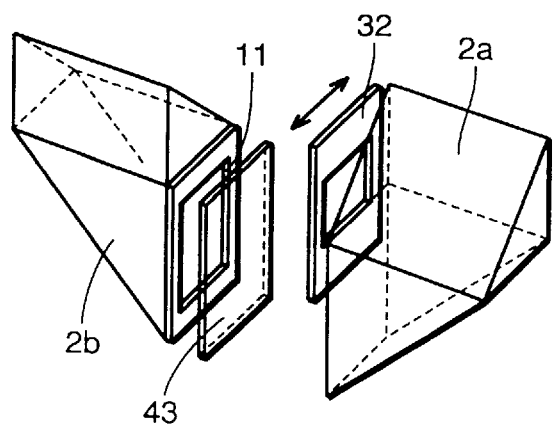

In FIGS. 20 and 21, using the H format as a reference field frame, the C format is indicated when a C format mask member 32 is entered, and the P format is indicated by liquid crystal 43 as a P format field frame member. FIG. 20 shows the C format field frame as indicated. FIG. 21 shows the P format field frame as indicated. Also in this case, only one field frame member needs to be moved, and therefore the mechanism can be reduced in size. FIGS. 6A to 6C show how the finder field looks in this case.

Figure 22:
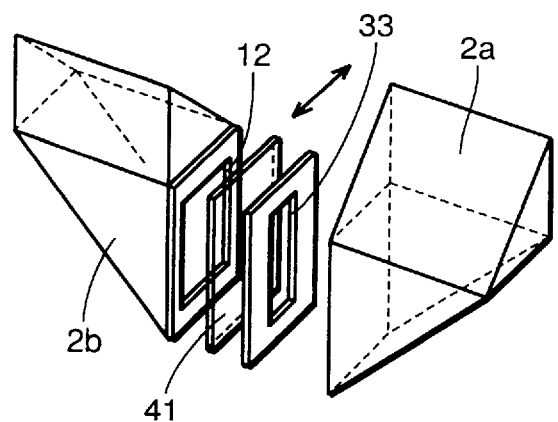
FIGS. 22 to 61 are views each showing a field frame switching mechanism.
Figure 23:
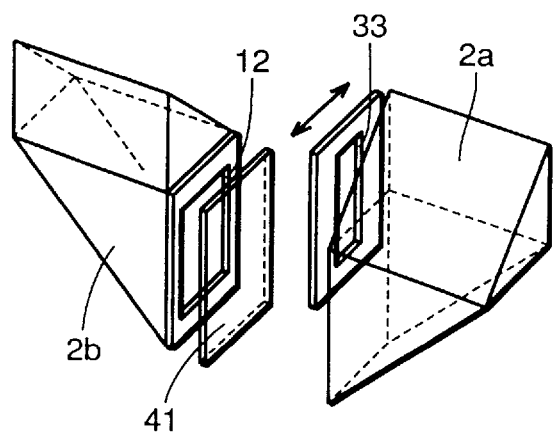

In FIGS. 22 and 23, using the C format as a reference field frame, the H format is indicated by liquid crystal 41 as an H format field frame member, and the P format is indicated when a P format field frame member 33 is entered. FIG. 22 shows the P format field frame. FIG. 23 shows the H and C format field frames as indicated. Also in this case, only one field frame member needs to be moved, the mechanism can be reduced in size. FIGS. 11A to 11C show how the finder field looks in the case.

Figure 24:
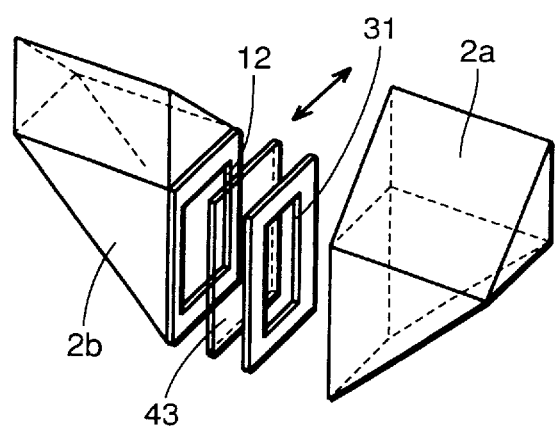
Figure 25:
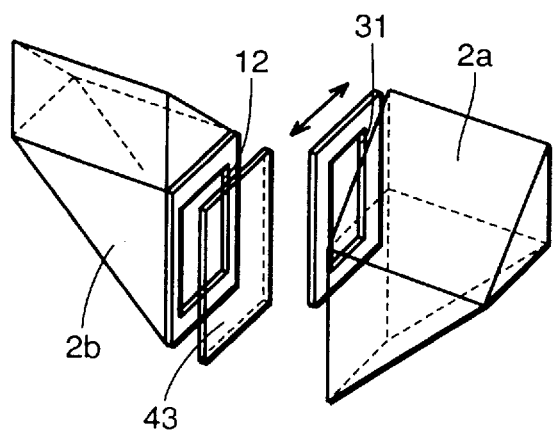

In FIGS. 24 and 25, using the C format as a reference field frame, the H format is indicated when an H format mask member 31 is entered, and the P format is indicated by liquid crystal for P format 43. FIG. 24 shows the H format field frame as indicated. FIG. 25 shows the C and P format field frames as indicated. Also in this case, only one field frame member needs to be moved, and therefore the mechanism can be reduced in size. FIGS. 11A to 11C show how the finder field looks in the case.

Figure 26:
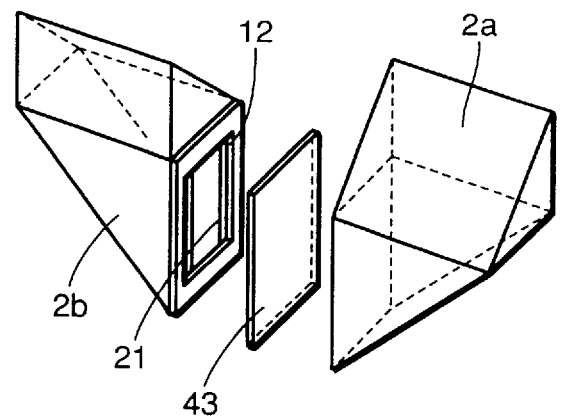

In FIG. 26, using the C format as a reference field frame, the H format is defined by H format marking lines 21, and the P format is indicated by liquid crystal for P format 43. No field frame member to move is necessary, the mechanism will be very much compact. FIGS. 8A and 8B show how the finder field looks in this case.

Figure 27:
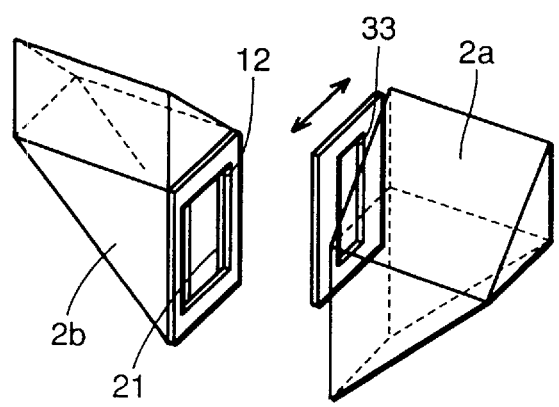
Figure 28:
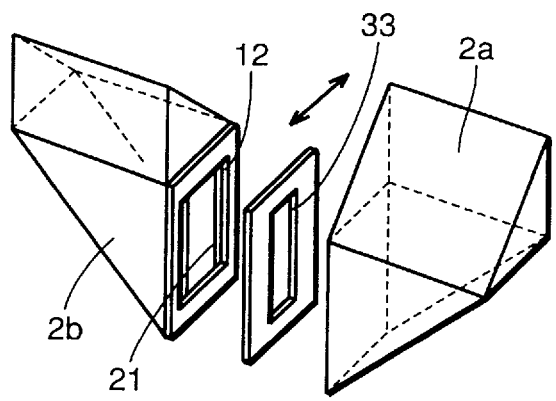

In FIGS. 27 and 28, using the C format as a reference field frame, the H format is defined by H format marking line 21, and the P format is indicated by a P format mask member 33. FIG. 27 shows the C format field frame as indicated. FIG. 28 shows the P format field frame as indicated. Also in this case, only one field frame member needs to be moved, the whole mechanism can be reduced in size. FIGS. 8A and 8B show how the finder field looks in this case.

Figure 29:
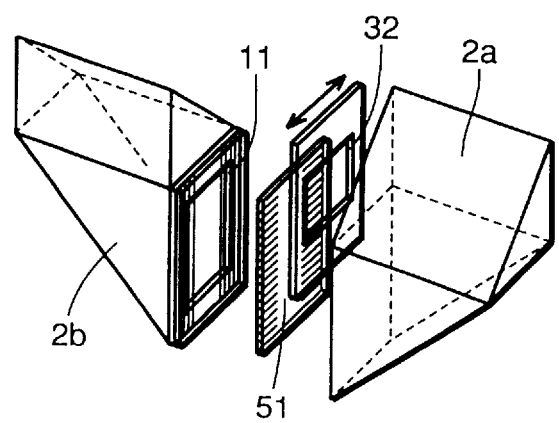
Figure 30:
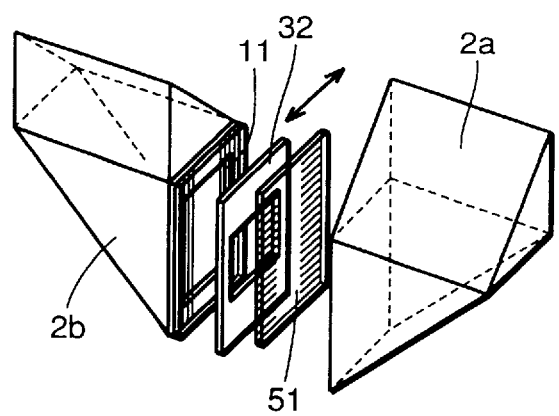
Figure 31:
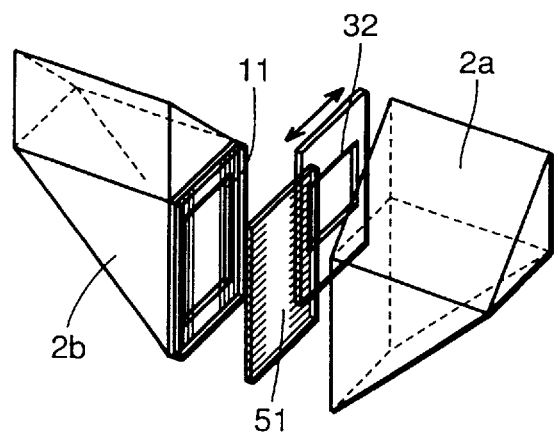

In FIGS. 29, 30 and 31, using the H format as a reference field frame, the C format is indicated when a C format mask member 32 is entered and the P format is indicated when a polarizing plate 51 as an H format field frame member is entered. FIG. 29 shows the H format field frame with no such member being inserted. FIG. 30 shows the C format field frame as indicated when C format field frame member 32 is inserted. FIG. 31 shows the P format field frame as indicated when P format polarizing plate 51 is inserted. The movement of polarizing plate does not require withdrawal as a whole as is the mask member. More specifically, polarizing plates need only be advanced/withdrawn such that the two polarizing plates having orthogonal polarizing patterns do not cross, and therefore, the amount of movement is far smaller than mask members. Therefore, the mechanism can be reduced in size. FIG. 6 shows how the finder field looks in this case.

Figure 32:
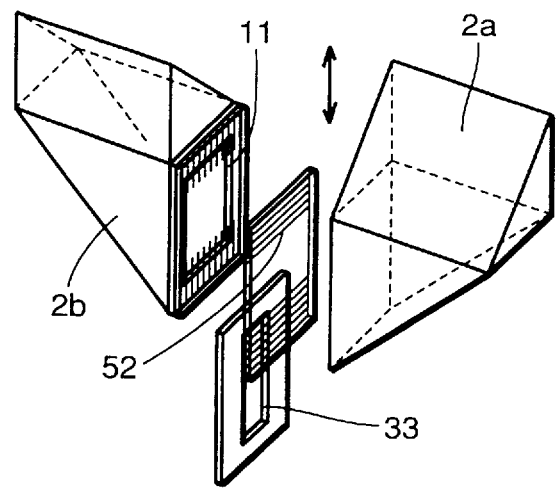
Figure 33:
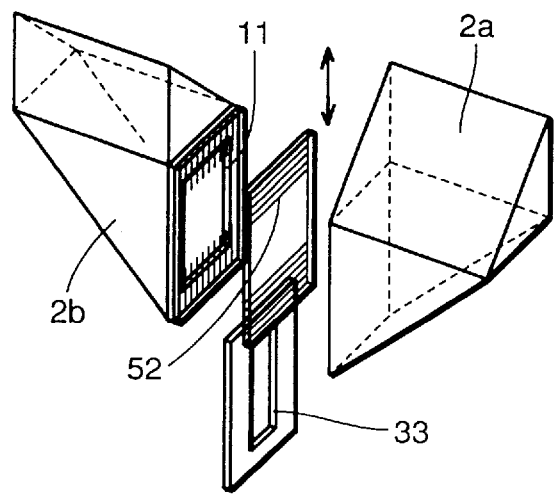
Figure 34:
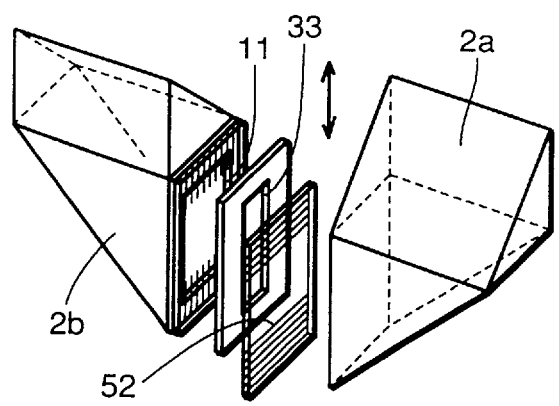

In FIGS. 32, 33 and 34, using the H format as a reference field frame, the C format is indicated when a C format polarizing plate 52 is inserted, and the P format is indicated when a P format mask member 33 is entered. FIG. 32 shows the H format field frame with no such member being entered. FIG. 33 shows the C format field frame as indicated when C format polarizing plate 52 is entered. FIG. 34 shows the P format field frame as indicated when P format mask member 33 is entered. In the movement of polarizing plates, the whole plates do not have to be withdrawn as opposed to mask members. More specifically, two polarizing plates need only be advanced/withdrawn such that these polarizing plates having polarizing patterns orthogonal to each other do not cross, and therefore, the amount of movement can be far smaller than mask members. Therefore, the mechanism can be reduced in size. FIGS. 6A to 6c show how the finder field looks in this case.

Figure 35:
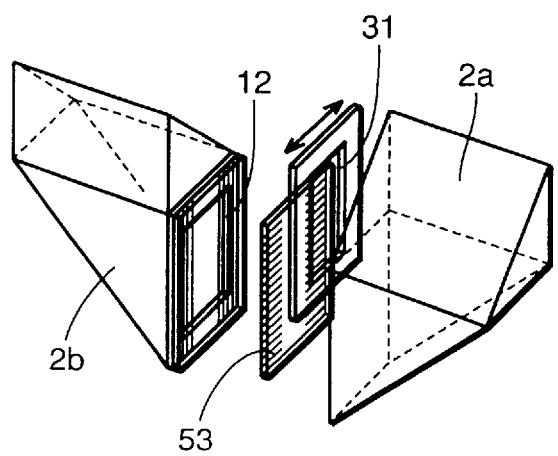
Figure 36:
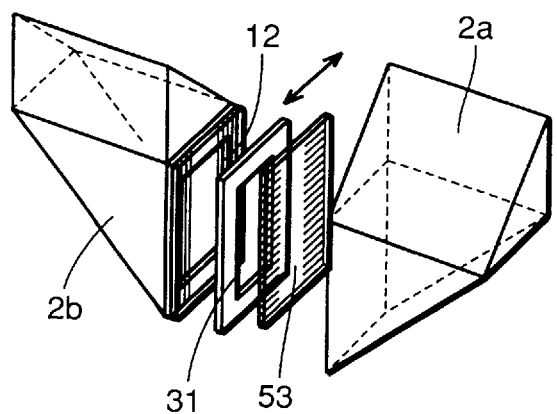
Figure 37:
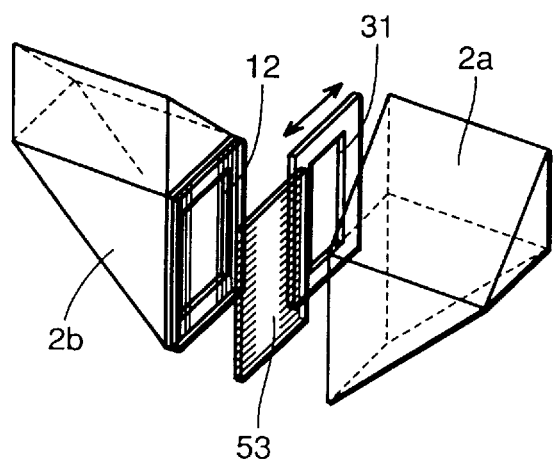

In FIGS. 35, 36 and 37, using the C format as a reference field frame, the H format is indicated when H format mask member 31 is entered, and the P format is indicated when P format polarizing plate 53 is entered.

FIG. 35 shows the C format field frame with no such member being entered. FIG. 36 shows the H format field frame when H format mask member 31 is entered. FIG. 37 shows the P format field frame when P format polarizing plate 53 is entered. As opposed to the mask members, the whole polarizing plates do not have to be withdrawn. More specifically, the case of polarizing plates requires an amount of movement far smaller than the case of mask members, because two polarizing plates need only be advanced/withdrawn such that the polarizing plates having polarizing patterns orthogonal to each other do not cross. Therefore, the size the mechanism can be reduced. FIGS. 11A to 11C show how the finder field looks in this case.

Figure 38:
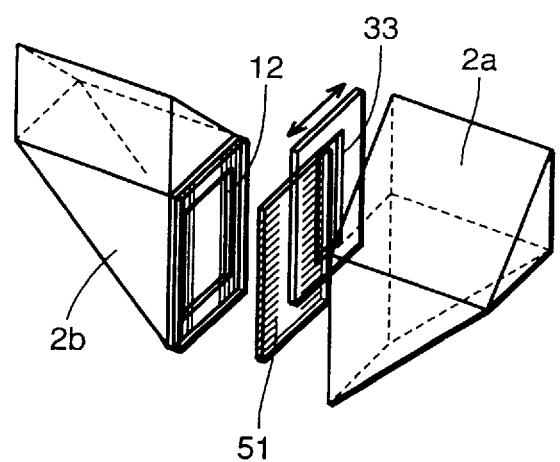
Figure 39:
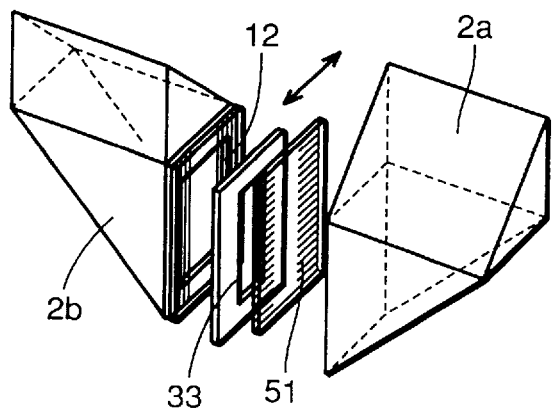
Figure 40:
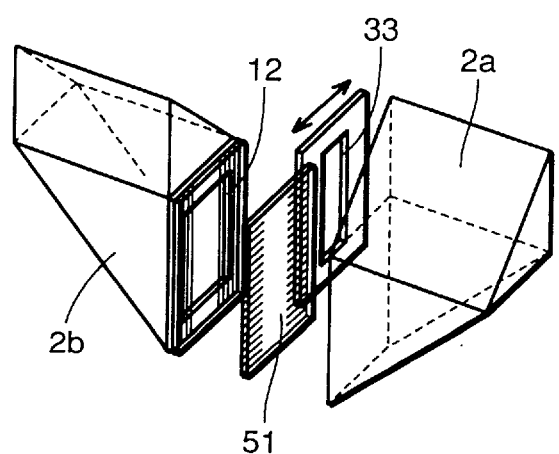

In FIGS. 38, 39 and 40, using the C format as a reference field frame, the H format is indicated when H format polarizing plate 51 is entered, and the P format is indicated when P format mask member 33 is entered. FIG. 38 shows the C format field frame with no such member being entered. FIG. 39 shows the P format field frame with P format mask member 33 being entered. FIG. 40 shows the H format field frame with H format polarizing plate 51 being entered. The whole polarizing plate does not have to be moved as opposed to the case of mask members. More specifically, two polarizing plates need only be advanced/withdrawn such that the polarizing plates having polarizing patterns orthogonal to each other do not cross, and therefore the amount of movement involved can be far smaller than the case of mask members. Therefore, the size of the mechanism can be reduced. FIGS. 11A to 11C show how the finder field looks in this case.

Figure 41:
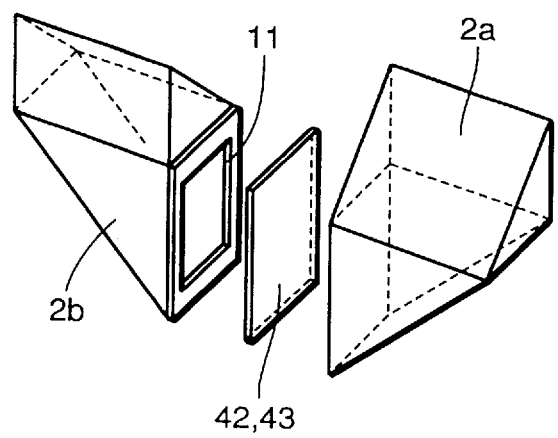
Figure 42:
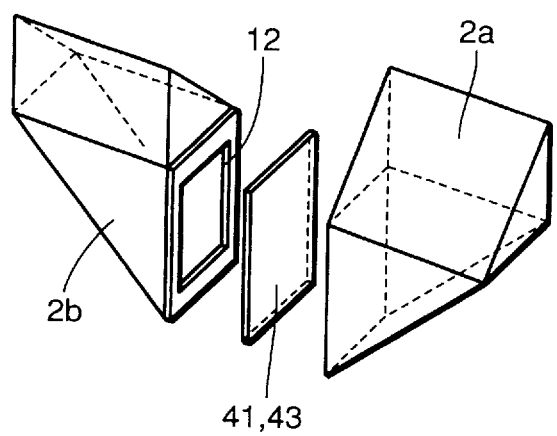

In FIG. 41, using the H format as a reference field frame, the C and P formats are indicated by C and P format liquid crystal 42 and 43. Since no mechanical type switching mechanism is provided, the whole structure can be very compact. FIGS. 5A to 5c show how the finder field looks in this case. In FIG. 42, using the C format as a reference field frame, the H and P formats are indicated by H and P format liquid crystal 41 and 43. In this case, no field frame member to move is provided, the whole structure can be very much compact. FIGS. 10A to 10C show how the finder field looks in this case.

Figure 43:
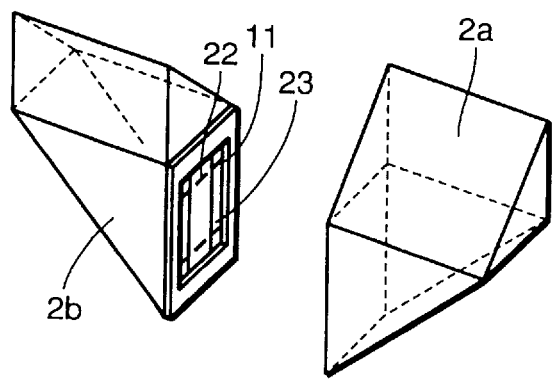

In FIG. 43, using the H format as a reference field frame, the C and P formats are indicated by C and P format marking lines 22 and 23. Also in this case, no field frame member to move is provided, the whole structure can be very compact. FIG. 2 shows how the finder field looks in this case.

Figure 44:
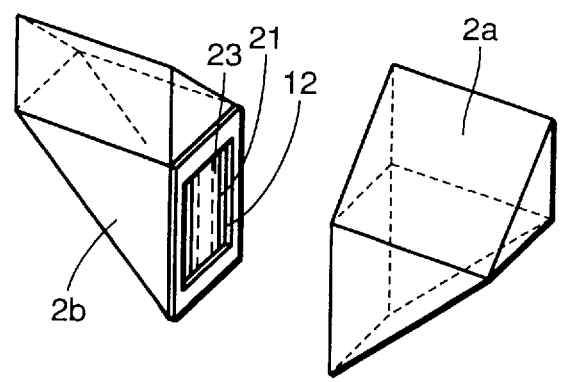

In FIG. 44, using the C format as a reference field frame, the H and P formats are indicated by H and P format marking lines 21 and 23. Also in this case, no field frame member to move is provided, the whole structure can be very compact. FIG. 7 shows how the finder field looks in this case.

Figure 45:
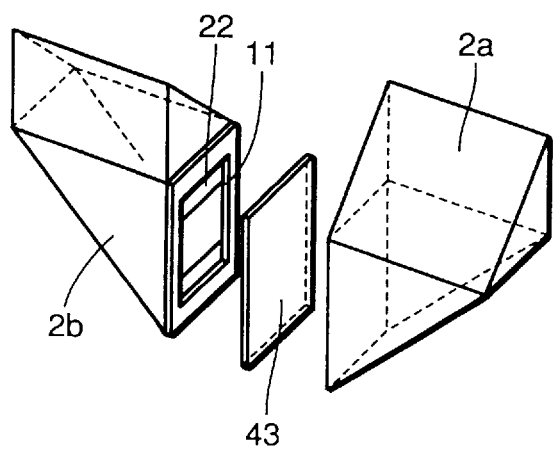

In FIG. 45, using the H format as a reference field frame, the C format is defined by C format marking line 22, the P format is indicated by P format liquid crystal 43. Also in this case, no field frame member to move is provided, and therefore the whole structure can be very compact. FIGS. 3A and 3B show how the finder field looks in this case.

Figure 46:
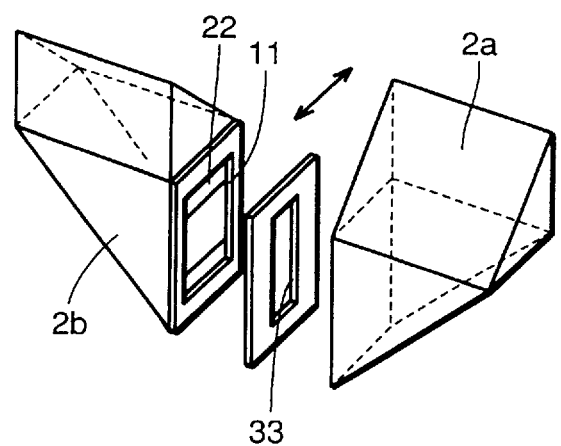
Figure 47:
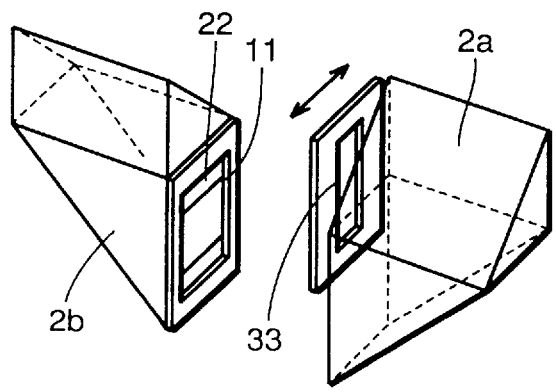

In FIGS. 46 and 47, using the H format as a reference field frame, the C format is defined by C format marking line 22, and the P format is indicated when P format mask member 33 is entered. FIG. 46 shows the P format field frame when P format mask member 33 is entered. FIG. 47 shows the H and C format field frames as indicated. In this case, only one field frame member needs to be moved, and therefore the whole structure can be reduced. FIGS. 3A and 3B show how the finder field looks in this case.

Figure 48:
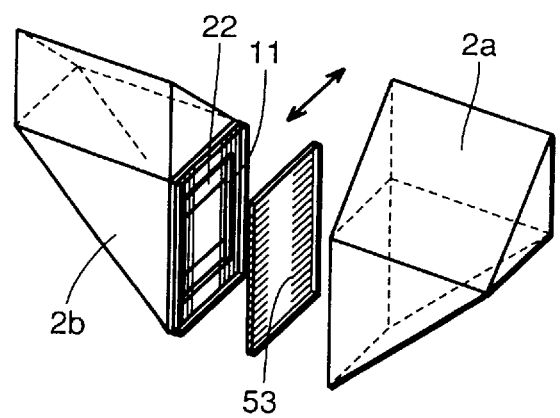
Figure 49:
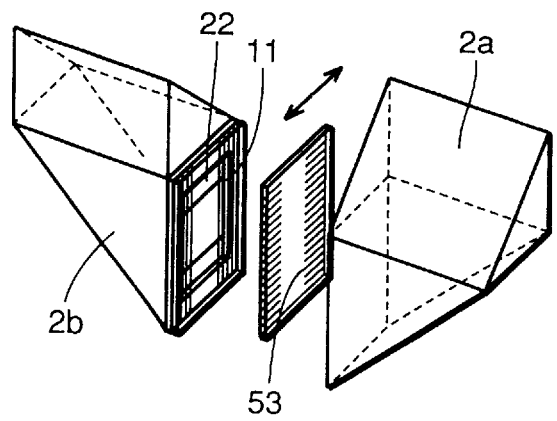

In FIGS. 48 and 49, using the H format as a reference, the C format is defined by C format marking line 22, and the P format is indicated when P format polarizing plate 43 is entered. FIG. 48 shows the P format field frame when P format polarizing plate 53 is entered. FIG. 49 shows the H and C format field frames 11 and 12 as indicated. In this case, only one field frame member needs to be moved, and therefore the whole structure can be reduced. Furthermore, since the polarizing plate is advanced/withdrawn, the amount of movement involved can be reduced. FIGS. 3A and 3B show how the finder field looks in this case.

Figure 50:
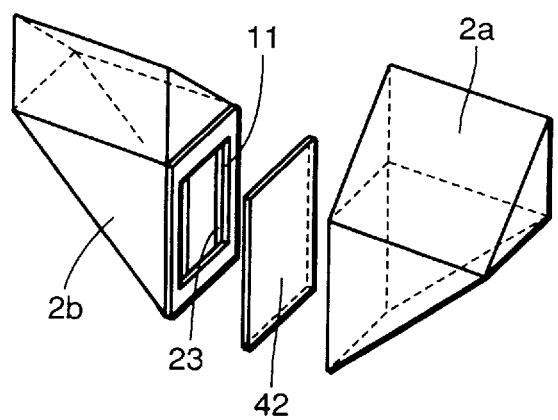

In FIG. 50, using the H format as a reference field frame, the C format is indicated by C format liquid crystal 42, and the P format is defined by P format marking lines 23. In this case, since no field frame member for movement is provided, the whole structure can be very compact. FIGS. 4A and 4B show how the finder field looks in this case.

Figure 51:
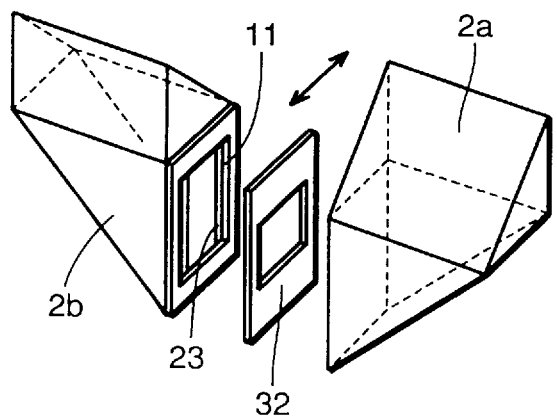
Figure 52:
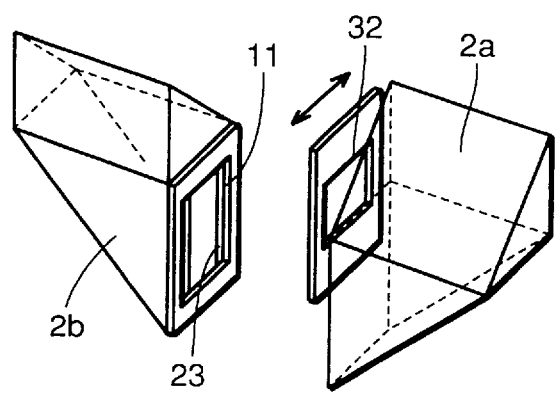

In FIGS. 51 and 52, using the H format as a reference field frame, the C format is indicated when C format mask member 32 is entered, and the P format is defined by P format marking lines 23. FIG. 51 shows the C format when C format mask member 32 is entered. FIG. 52 shows the H and P format field frames as indicated. In this case, only one field frame member needs to be moved, and therefore the whole structure can be reduced in size. FIGS. 4A and 4B show how the finder looks in this case.

Figure 53:
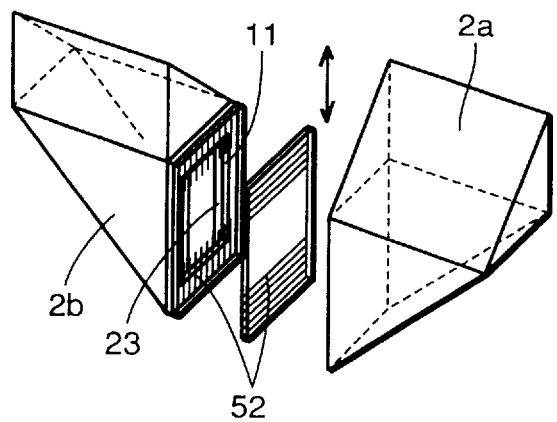
Figure 54:
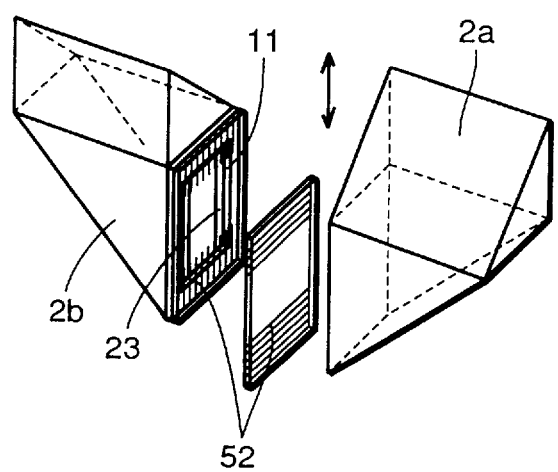

In FIGS. 53 and 54, using the H format as a reference field frame, the P format is defined by P format marking lines 23, and the C format is indicated when C format polarizing plate 52 is entered. FIG. 53 shows the C format field frame as indicated with C format polarizing plate 52 being entered. FIG. 54 shows H and P format field frames 11 and 13 as indicated. In this case, since only one field frame member needs to be moved, the whole structure can be reduced in size. Since the polarizing plate is entered./withdrawn, the amount of movement involved can be small. FIGS. 4A and 4B show how the finder field looks in this case.

Figure 55:
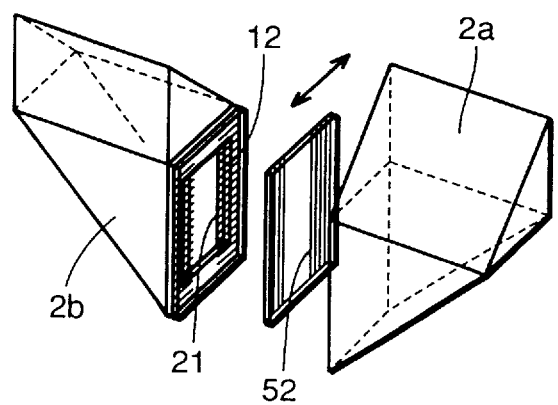
Figure 56:
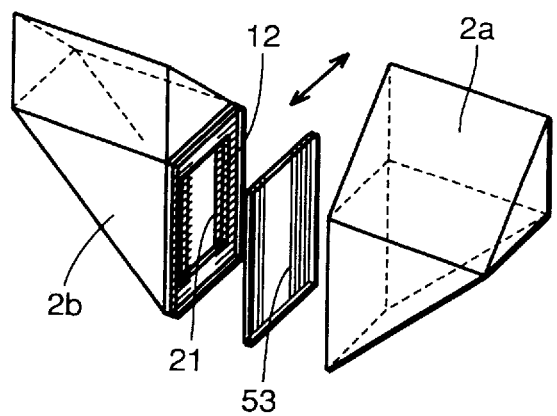

In FIGS. 55 and 56, using the c format as a reference field frame, the H format is defined by H format marking lines 21, the P format is indicated when P format polarizing plate 53 is entered. FIG. 55 shows the H and C format field frames. FIG. 56 shows the P format field frame with P format polarizing plate 53 being entered. In this case, only one field frame member needs to be moved, and therefore the whole structure can be reduced in size. The polarizing plate is entered and/withdrawn, and therefore the amount of movement involved can be small. FIGS. 8A and 8B show how the finder field looks in this case.

Figure 57:
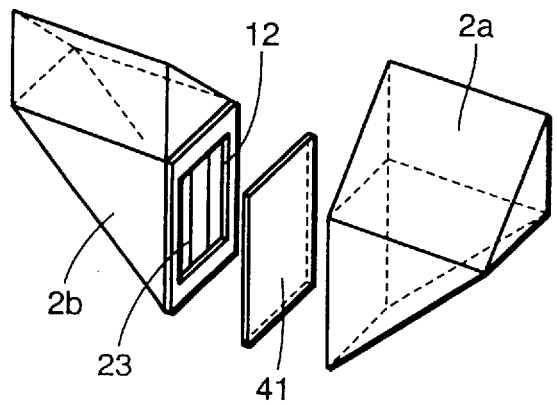

In FIG. 57, using the C format as a reference frame, the H format is indicated by H format liquid crystal 41, and the P format is indicated by P format marking lines 23. In this case, since no field frame member to move is provided, the whole structure can be very compact. FIGS. 9A and 9B show how the finder field looks in this case.

Figure 58:
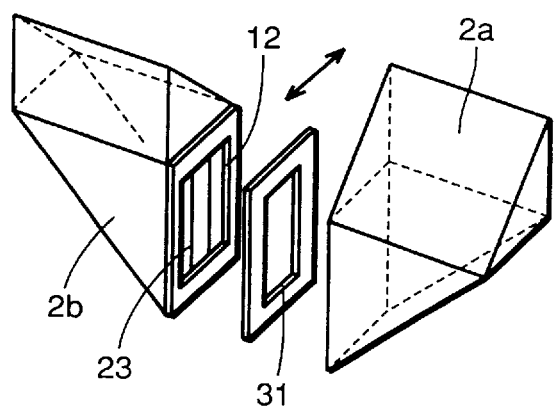
Figure 59:
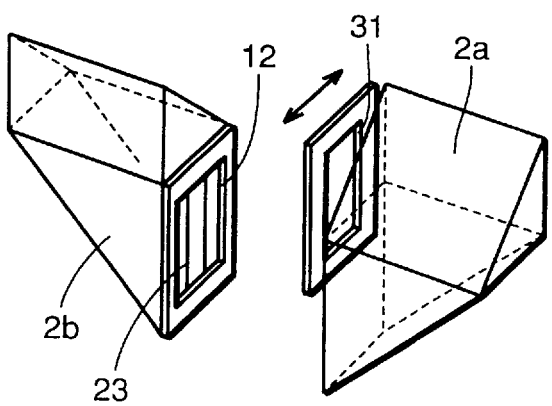

In FIGS. 58 and 59, using the C format as a reference field frame, the P format is defined by C format marking lines 23, and the H format is indicated when an H format mask member 31 is entered. FIG. 58 shows the H format field frame when H format mask member 31 is entered. FIG. 59 shows the C and P format field frames as indicated. In this case, only one field frame member should be moved, and the whole structure can be reduced in size. FIGS. 9A and 9B show how the finder field looks in this case.

Figure 60:
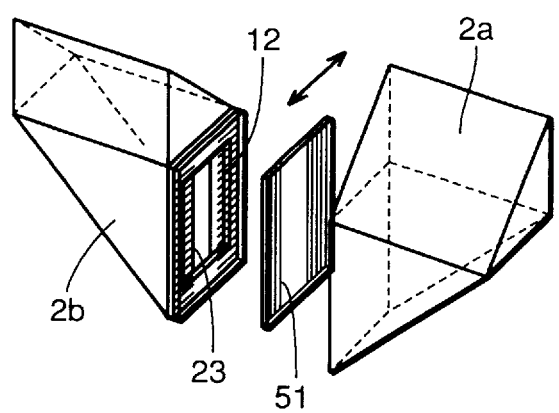
Figure 61:
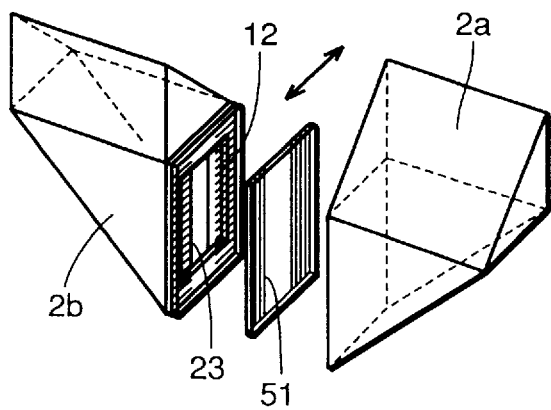

In FIGS. 60 and 61, using the C format as a reference field frame, the P format is defined by P format marking lines 23 and the H format is indicated when the H format polarizing plate 51 is entered. FIG. 60 shows the C and P format field frames as indicated. FIG. 61 shows the H format field frame when H format polarizing plate 51 is entered. In this case, only one field frame member should be moved, and therefore the whole structure can be reduced in size. The polarizing plate is entered and/withdrawn, and therefore the amount of movement involved can be small. FIGS. 9A and 9B show how the finder field looks in this case.

The field frame switching mechanisms described above are represented in Table 1. Note that a switching mechanism using a mask member is referred to as mechanical type.

TABLE 1

| Group | H | C | P | FIGS. | How it Looks |
|---|---|---|---|---|---|
| Conventional | Base | Mechanical Type | Mechanical Type | 12, 13, 14 | 6A–6C |
| 1 | Mechanical Type | Base | Mechanical Type | 15, 16, 17 | 11A–11C |
| 2 | Base | Liquid Crystal | Mechanical Type | 18, 19 | 6A–6C |
|  | Base | Mechanical Type | Liquid Crystal | 20, 21 | 6A–6C |
|  | Liquid Crystal | Base | Mechanical Type | 22, 23 | 11A–11C |
|  | Mechanical Type | Base | Liquid Crystal | 24, 25 | 11A–11C |
| 3 | Marking Line | Base | Liquid Crystal | 26 | 8A, 8B |
|  | Marking Line | Base | Mechanical Type | 27, 28 | 8A, 8B |
| 4 | Base | Mechanical Type | Polarizing Plate | 29, 30, 31 | 5A–5C |
|  | Base | Polarizing Plate | Mechanical Type | 32, 33, 34 | 5A–5C |
|  | Mechanical | Base | Polarizing | 35, 36, 37 | 11A–11C |

TABLE 1-continued

| Group | H | C | P | FIGS. | How it Looks |
|---|---|---|---|---|---|
| | Type Polarizing Plate | Base | Plate Mechanical Type | 38, 39, 40 | 11A–11C |
| 5 | Base | Liquid Crystal | Liquid Crystal | 41 | 5A, 5B |
| | Liquid Crystal | Base | Liquid Crystal | 42 | 10A–10C |
| 6 | Base | Marking Line | Marking Line | 43 | 2 |
| | Marking Line | Base | Marking Line | 44 | 7 |
| 7 | Base | Marking Line | Liquid Crystal | 45 | 3A, 3B |
| | Base | Marking Line | Mechanical Type | 46, 47 | 3A, 3B |
| | Base | Marking Line | Polarizing Plate | 48, 49 | 3A, 3B |
| | Base | Liquid Crystal | Marking Line | 50 | 4A, 4B |
| | Base | Mechanical Type | Marking Line | 51, 52 | 4A, 4B |
| | Base | Polarizing Plate | Marking Line | 53, 54 | 4A, 4B |
| | Marking Line | Base | Polarizing Plate | 55, 56 | 8A, 8B |
| | Liquid Crystal | Base | Marking Line | 57 | 9A, 9B |
| | Mechanical Type | Base | Marking Line | 58, 59 | 9A, 9B |
| | Polarizing Plate | Base | Marking Line | 60, 61 | 9A, 9B |
| 8 | Base | Liquid Crystal | Polarizing Plate | — | — |
| | Base | Polarizing Plate | Liquid Crystal | — | — |
| | Liquid Crystal | Base | Polarizing Plate | — | — |
| | Polarizing Plate | Base | Liquid Crystal | — | — |
| | Base | Polarizing Plate | Polarizing Plate | — | — |
| | Polarizing Plate | Base | Polarizing Plate | — | — |

Group 1 performs mechanical type switching based on the C format, and is advantageous in mechanical arrangement.

Group 2 performs switching of one field frame by liquid crystal and another mechanically based on the reference field frame (base). This method is advantageous if two switching mechanisms are necessary and the whole structure should be compact and inexpensive.

In Group 3, the H format is defined by marking lines with respect to the C format field frame as a reference field frame, the P format field frame is indicated by liquid crystal or a mask member. This method allows field frame corresponding to the three formats to be indicated effectively using a single switching mechanism.

In Group 4, there are provided two moving type switching mechanisms, one of which takes advantage of the movement of a polarizing plate, and therefore the whole structure can be very compact.

In Group 5, the two field frames are switched by liquid crystal with respect to the reference field frame, and therefore no movement is involved. Therefore, the field frames for the three formats can be switched with a very simple structure.

In group 6, the two field frames are indicated by marking lines with respect to the reference field frame, and therefore the structure can be very inexpensive.

In group 7, one of the field frames is defined by marking lines, an inexpensive structure results.

In group 8, one of the field frames is indicated by liquid crystal with respect to the reference field frame, and the other is indicated by a polarizing plate. According to this method, the field frame member to be moved is only the polarizing plate which requires only a small amount of movement, and therefore the structure can be compact.

Figure 63A:
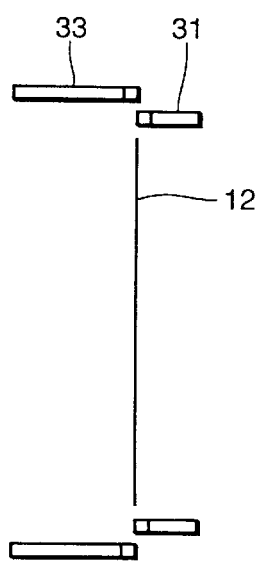
FIGS. 63A to 63C are cross sectional views each showing the field frame switching mechanism of mechanical type using the C format as reference.
Figure 63B:
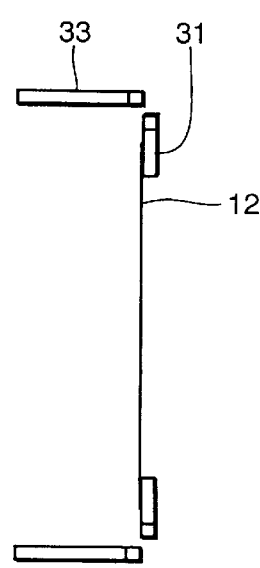
Figure 63C:
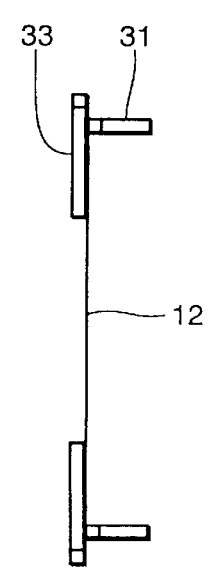
Figure 64C:
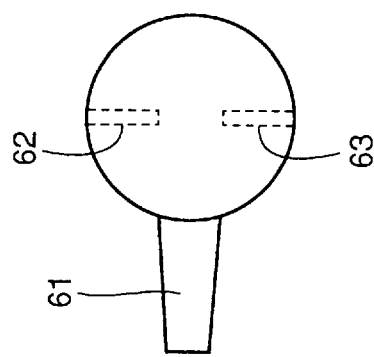
FIGS. 64A to 64C are views each showing an operation portion for the field frame switching mechanism of mechanical type using the C format as reference.
Figure 64B:
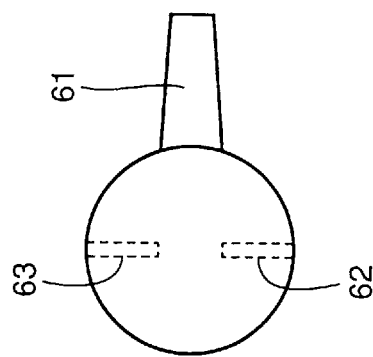
Figure 64A:
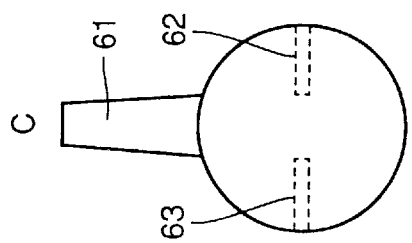
Figure 65:
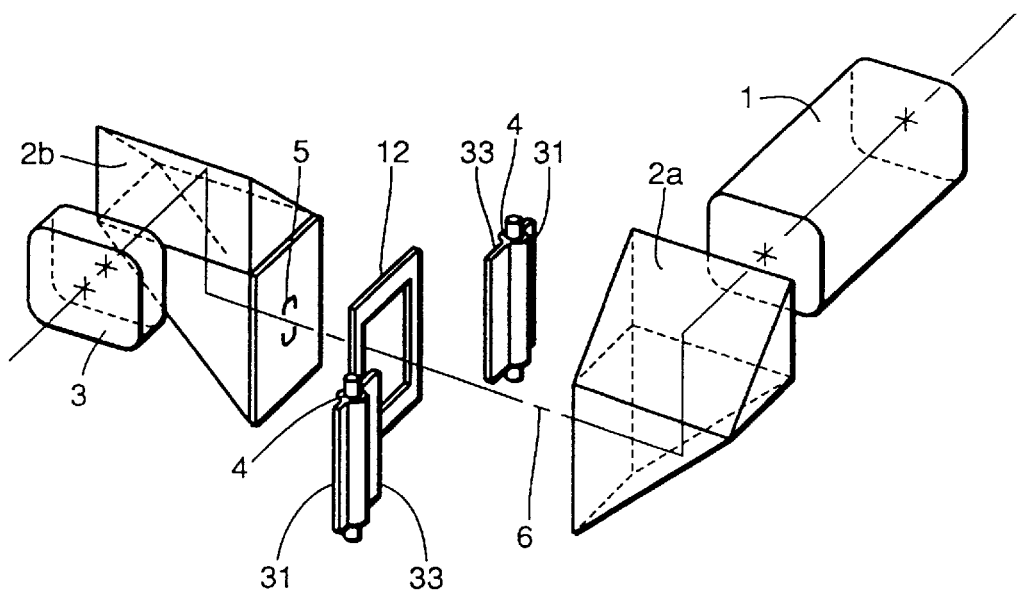
FIGS. 65 to 68 are cross sectional views showing a field frame switching mechanism of another mechanical type using the C format as reference.

FIGS. 62 to 64 show one embodiment of a mechanical type switching mechanism which switches the field frame among the C format as a reference field frame and the H and P formats using mask members. The H and P format mask members 31 and 33 are operated by a field frame switching lever 61 provided outside the camera body. H format engaging lever 62 and a P format engaging lever 63 can be engaged with an H format mask member 31 and a P format mask member 33 on the rear side of field frame switching lever 61, in other words inside the body. FIG. 64A shows a state for indicating the C format field frame. In this state, H format engaging lever 62 and P format engaging lever 63 are not in engagement with H format mask member 31 and P format mask member 33. When field frame switching lever 61 is rotated clockwise in order to indicate the H format field frame (FIG. 64B), H format engaging lever 62 and H format mask member 31 engage with each other, and the field frame is switched to the H format field frame. When field frame switching lever 61 is rotated clockwise in order to indicate the P format (as in FIG. 64C), P format engaging lever 63 and P format mask member 33 engage with each other, and the field frame is switched to the P format field frame. Thus, using the C format field frame as a reference field frame, the field frame can be switched in a very simple manner using the mechanical type switching mechanism.

Figure 66:
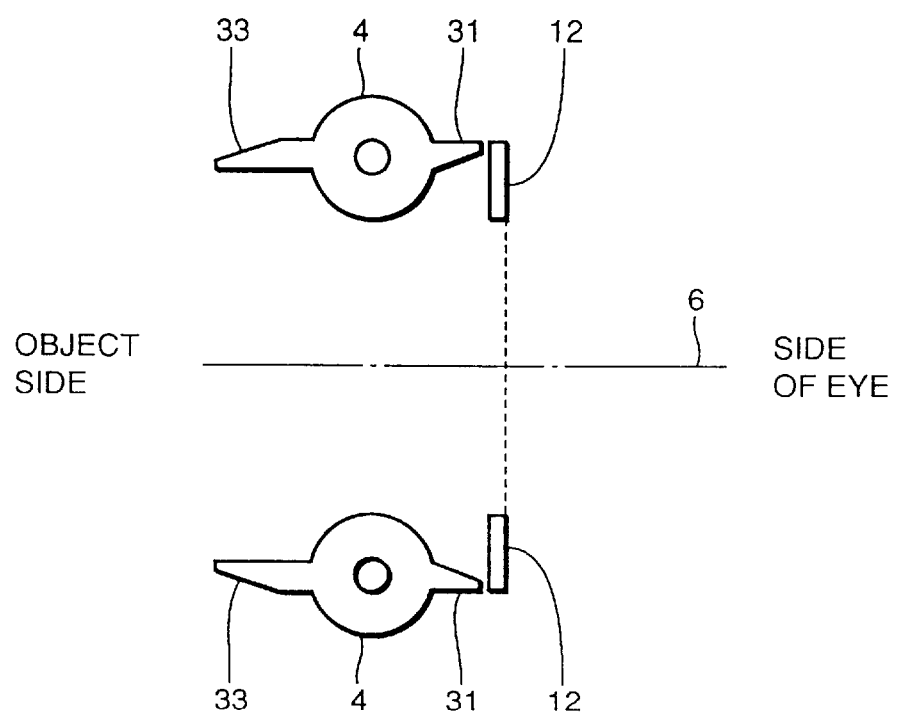
Figure 67:
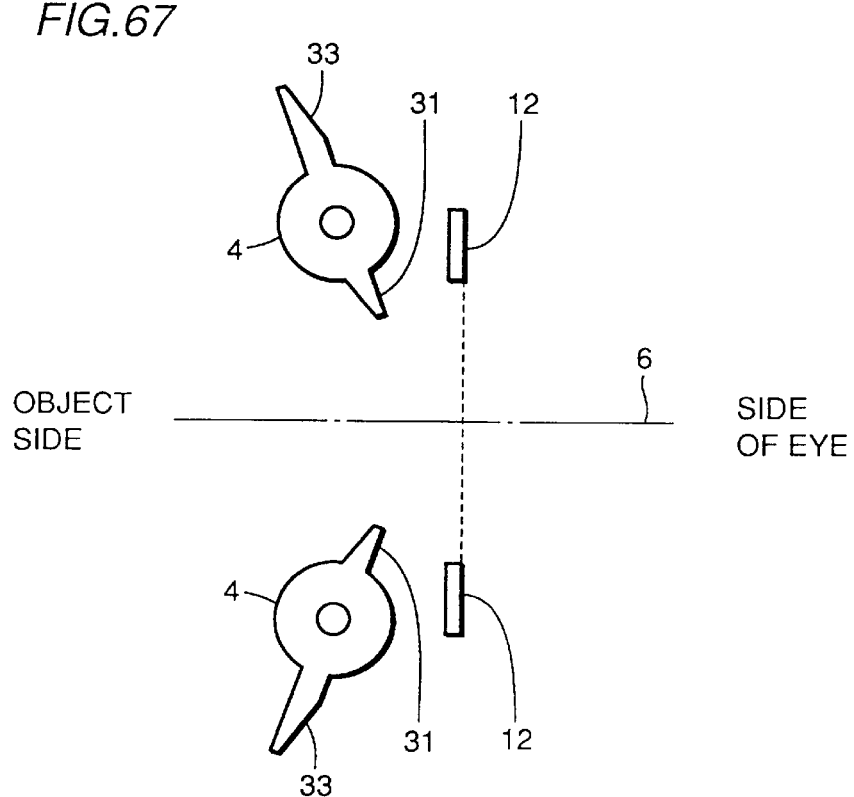
Figure 68:
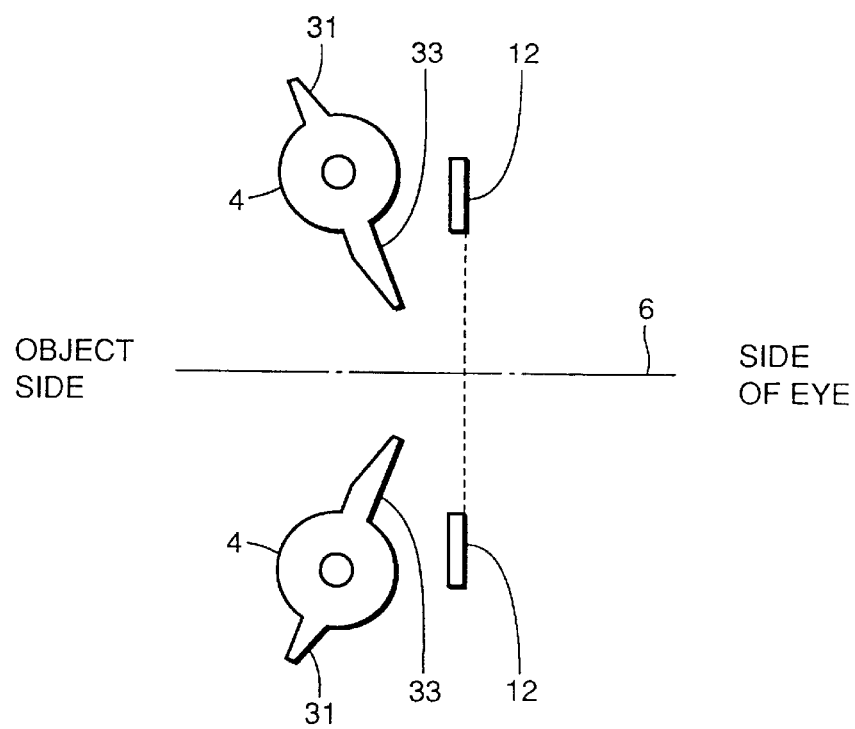

FIGS. 65 to 68 show another embodiment in which the field frame is switched between the C format field frame as a reference field frame and the H and P format field frames. FIGS. 66, 67 and 68 are cross sectional views of a field frame switching mechanism 4 according to the present invention showing the cases of indicating the C, H and P format field frames, respectively. In this embodiment, since the H and P format mask members 31 and 33 are integrally formed, the number of components can be reduced, thus reducing the cost. Mask members 31 and 33 are operated by the operation of a field frame switching lever provided outside the body, and field frame switching mechanism 4 rotates. In the state of indicating the C format field frame, only C format reference field frame 12 is indicated, in the state of indicating the H format field frame, H format mask member 31 is indicated within C format reference field frame 12, and in the state of indicating the P format field frame, P format mask member 33 is indicted within C format reference field frame 12.

Now, how a field frame is indicated in the state of photographing at close range will be described.

Figure 69:
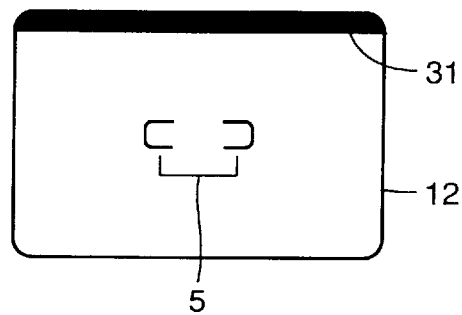
FIGS. 69 to 78 are views each showing how the finder image looks in parallax indication.
Figure 70:
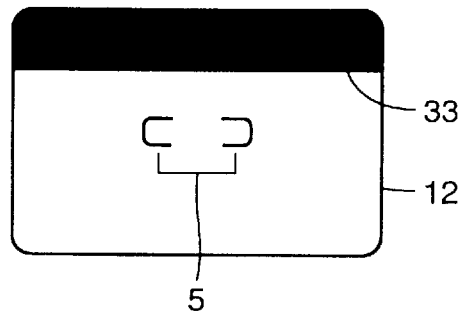

In FIGS. 69 to 70 using the C format field frame as a reference field frame, the field frame is switched between the H and C format field frames by a mechanical type switching mechanism. H and P format mask members 31 and 33 as described above are formed into a structure which can be independently indicated at the upper and lower sides of a field to indicate a field frame in the state of photographing at close range, so that a photographer is notified of parallax generated upon photographing at close range. FIGS. 11A to 11C show how the finder field looks according to each format in the case of photographing at usual range according to this embodiment. FIG. 69 shows how the finder field looks if photographing is performed at close range in the state of indicating the C format field frame. By indicating H format mask member 31, a field frame corresponding to the close range photographing state is shown. FIG. 70 shows how the finder field looks if a close range photographing is performed in the state of indicating the H format field frame or the C format field frame. By indicating P format mask member 33, a field frame corresponding to the close range photographing state is indicated. In the H format, H format mask member 31 on the lower side of the field is not indicated, in other words the field is only shifted toward the lower side for indication, and therefore the range of finder field is not reduced, thus permitting a field frame corresponding to the close range photographing state to be indicated. Such indication of the field frame corresponding to these close range photographing states improves the ease of handling the device by the user, because the indication/no indication is automatically determined based on distance measuring data.

Figure 71C:
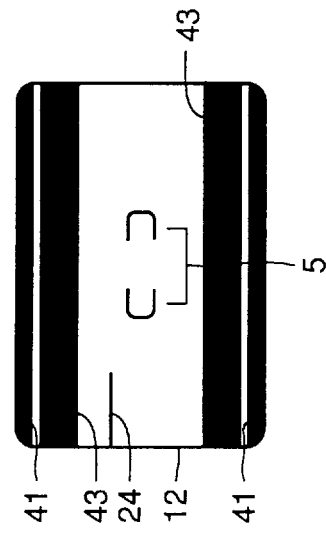
Figure 71B:
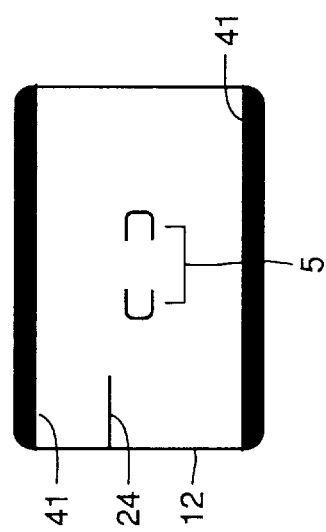
Figure 71A:
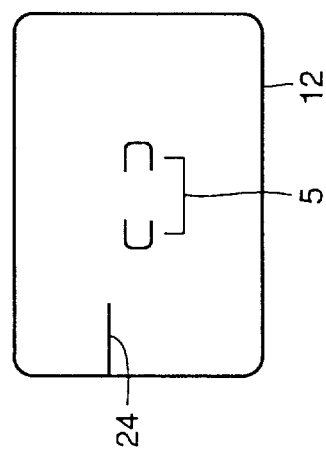
Figure 72:
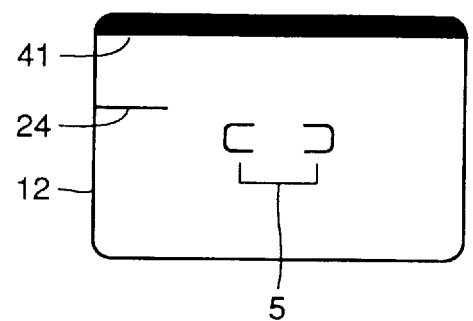
Figure 73:
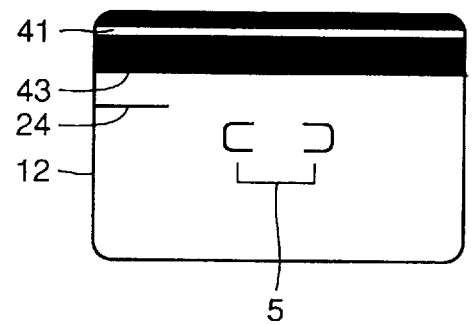
Figure 74:
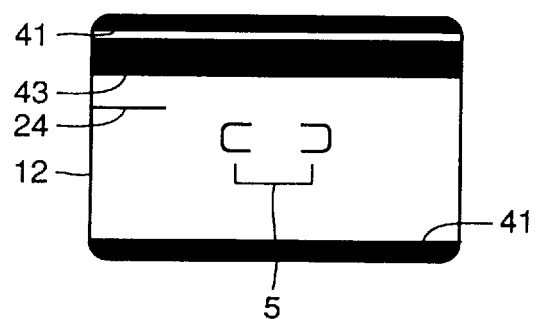

FIGS. 71A to 74 show the case in which the field frame is switched between the H and P by the liquid crystal using the C format field frame as a reference field frame. H and P format liquid crystal 41 and 43 is formed into a structure which can be independently indicated on the upper and lower sides of the field, in order to indicate a field frame at a close range photographing state, and the photographer is notified of a field frame generated upon photographing at close range. FIGS. 71A to 71C show how the finder field looks in each format upon photographing at usual range according to the invention. A marking line 24 for indicating a field frame corresponding to the close range photographing state is indicated, and therefore in the P format a field frame corresponding to the close range photographing state can be indicated. FIG. 72 shows how the finder field looks upon photographing at close range in the C format field frame indication state. By the indication by H format liquid crystal 41, a field frame corresponding to the close range photographing state is indicated. FIG. 73 shows how the finder field looks upon photographing at close range in the H format field frame indication state or upon photographing at closer range in the C format field frame indication state. By the indication of P format liquid crystal 43, a field frame corresponding to the close range photographing state is indicated. In the H format, H format liquid crystal 41 on the lower side of the field is not indicated, the field is only shifted toward the lower side for indication, and therefore the range of finder field is not reduced, thus indicating a field frame corresponding to the close range photographing state. FIG. 74 shows how the finder field looks upon photographing at close range in the P format field frame indication state. In this case, a marking line 24 for indicating a field frame corresponding to the close photographing state is used for defining the upper side of the field, and H format liquid crystal 41 is used for the lower side of the field. The indication of the field frames corresponding to these close range photographing states improves the ease of handling the device by the user, because such indication/non-indication. is automatically determined based on the distance measuring information. If marking line 24 for indicating the field frame corresponding to the close range photographing state is used, indexes are preferably indicated by illuminating the marking line.

Figure 75:
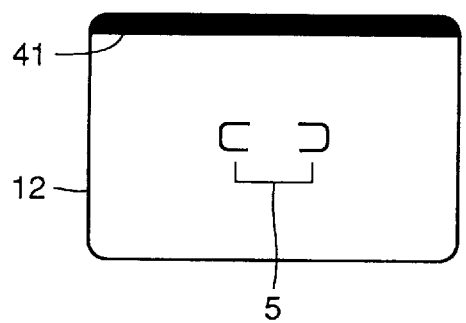
Figure 76:
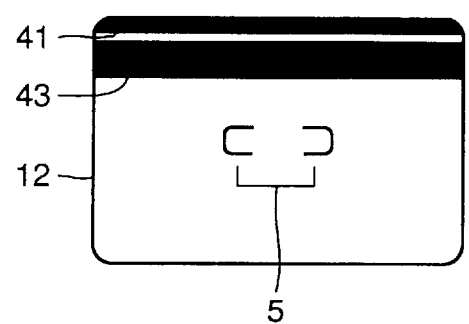
Figure 77:
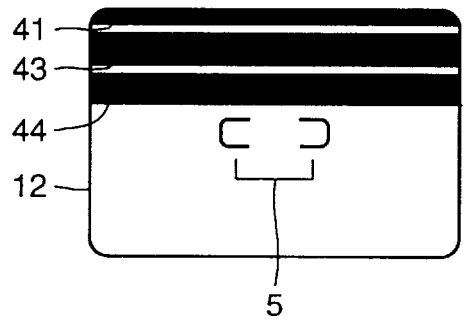
Figure 78:
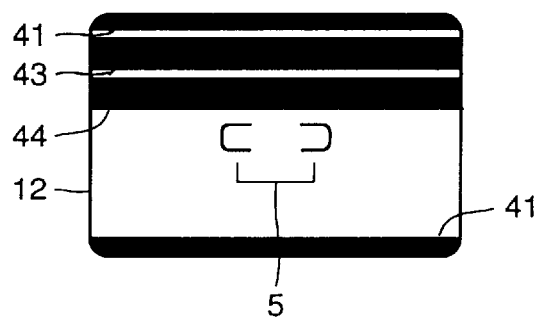

FIGS. 75 to 78 show the switching of the field frame between the C format field frame as reference and the H and P format field frames by liquid crystal. H and P format liquid crystal 41 and 43 as described above is formed into a structure which can be indicated independently on the upper and lower sides of the field, in order to indicate field frames in a close range photographing state and the photographer is notified of parallax generated upon photographing at close range. FIGS. 10A to 10C show how the finder field looks in each format in a usual range photographing according to the present embodiment. By indicating a parallax indication field frame 44, a field frame corresponding to the close range photographing state can be indicated in the P format. FIG. 75 shows how the finder field looks upon photographing at close range in the C format field frame indication state. By indicating H format liquid crystal 43, a field frame corresponding to the close range photographing state is indicated. FIG. 76 shows how the finder field looks upon photographing at close range in the H format field frame indication state or upon photographing at even closer range in the C format field frame indication state. By indicating P format liquid crystal 43, a field frame corresponding to the close range photographing state is indicated. In the H format, H format liquid crystal 41 on the lower side of the field is not indicated, the field is shifted toward the lower side for indication, and the field frame corresponding to the close range photographing state can be indicated without reducing the range of finder field. FIG. 77 shows how the finder field looks upon photographing at even closer range in the H format field frame indication state, or upon macro photographing in the C format field frame indication state. By indicating parallax indication liquid crystal 44, a field frame corresponding to a larger close range photographing state is indicated. In the C format, however, the range of field of the finder is relatively reduced. FIG. 78 shows how the finder field looks upon photographing at close range in the P format field frame indication state. In this case, parallax indication liquid crystal 44 is used at the upper side of the field, while H format liquid crystal 41 is used for the lower side of the field. The indication of the field frames corresponding to these close range photographing states improves the ease of handling the device by the user, if such indication/non-indication is automatically determined based on the distance measuring information.

As described above, the mechanical type switching mechanism can be utilized as another switching mechanism for indicating a field frame corresponding to a close range photographing state which also corresponds to the P format. However, since the field mask on the upper side of the field must be indicated in three stages, if an integrally formed field frame as shown in FIGS. 65 to 68 is considered, the mask must be arranged apart from the reference field frame for the amount of the length of P format mask, the diopter is largely shifted.

Now, indication within a finder image plane will be described.

Figure 79:
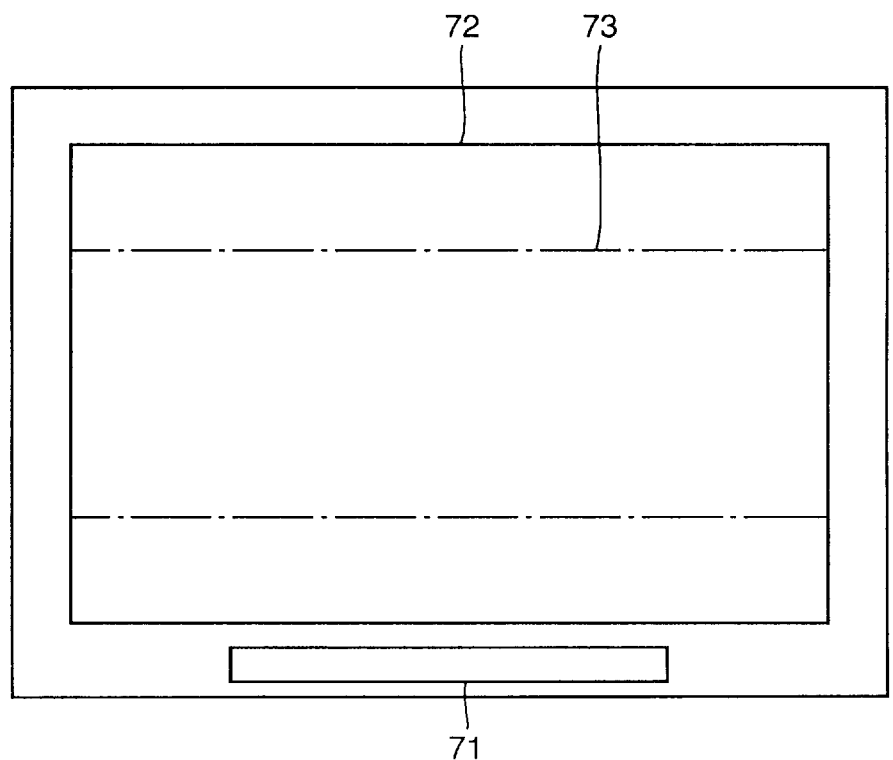
FIGS. 79 and 80 are views for use in illustration of conventional type indication made outside an image plane.
Figure 80:
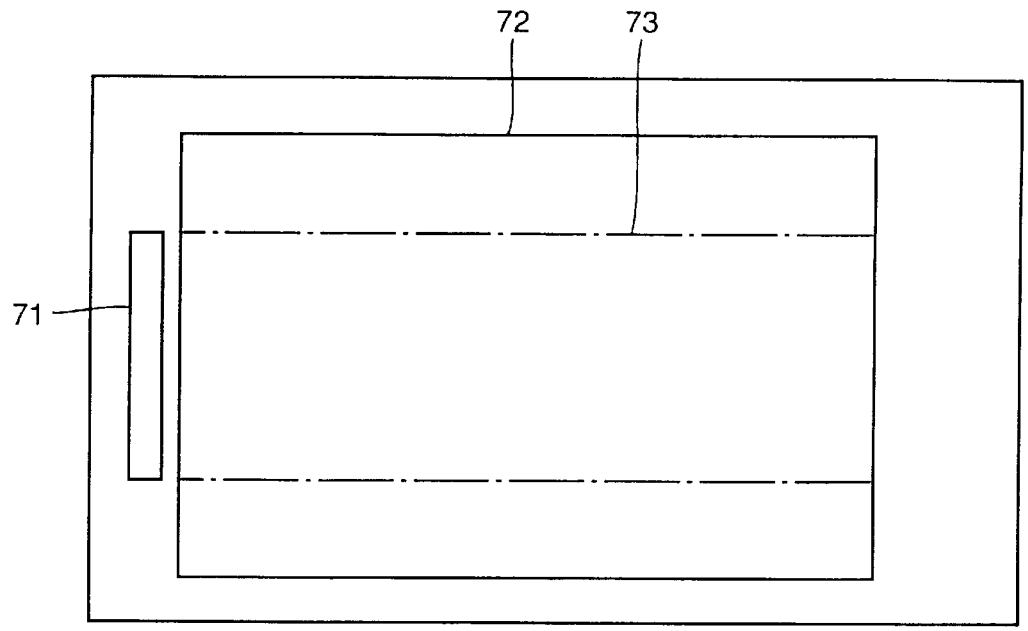

Indication outside the image plane of a conventional field frame indication device which can change the image plane indication size is shown in FIG. 79. Relative to a first field frame 72, a second field frame 73 is defined by shielding light from the upward and downward directions or providing marking lines. Such indication is then provided under the image plane. Such indication outside image plane is important not only in terms of the function of indicating information but also in terms of the correlation with the image plane, in other words, it is important not to give the user a feeling of inconsistency upon switching the image frame or prevent erroneous operations. The indication outside the image plane as shown in FIG. 80 is suggested to cope with such situation. Indication outside image plane 71 is placed at the left of reference field frame (first field frame) 72 in a width approximately the same as that of second field frame 73.

Figure 81:
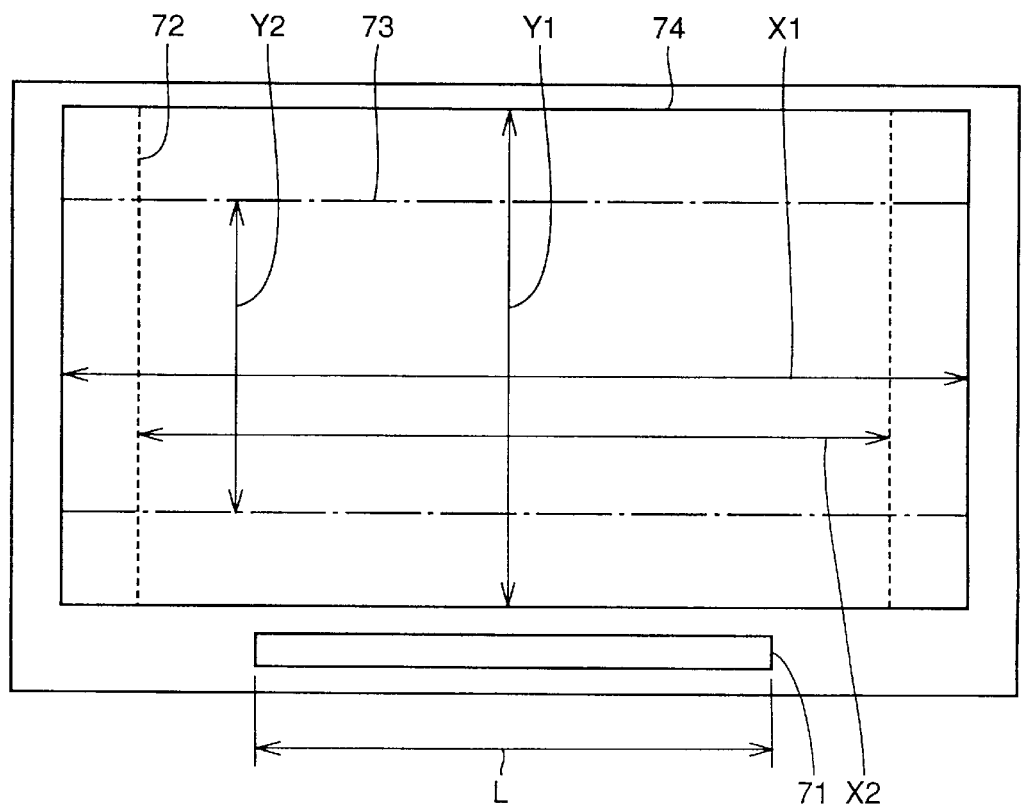
FIGS. 81 to 83 are views for use in illustration indication outside an image plane.

FIG. 81 shows one embodiment of indication outside the image plane. First field frame 72 is defined by shielding light left and right portions or providing marking lines relative to a third field frame 74. Second field frame 73 is defined by shielding light from upward and downward directions for providing marking lines. The size of third field frame 74 is represented by X1 in the horizontal direction and Y1 in the vertical direction. The size of first field frame 72 is represented by X2 in the horizontal direction and Y1 in the vertical direction. The size of second field frame 73 is represented by X1 in the horizontal direction and Y2 in the vertical direction. The length of indication outside image plane 71 in the horizontal direction L is shorter than the length of first field frame 72 in the horizontal direction and longer than the width of second field frame in the vertical direction.

Figure 82:
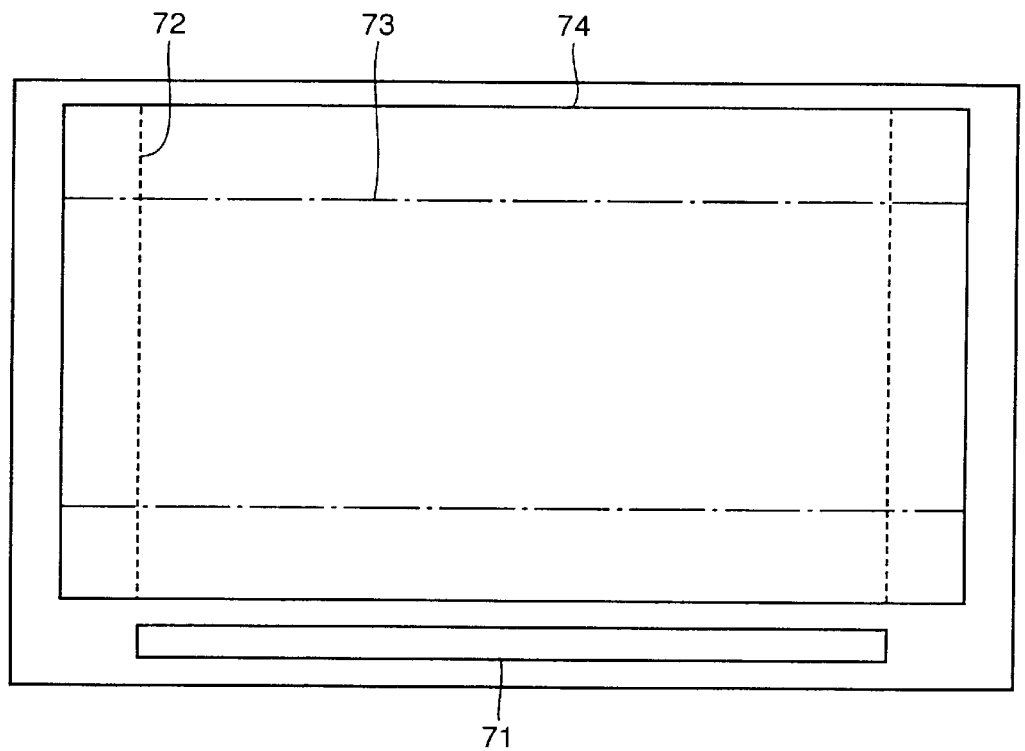

FIG. 82 shows another embodiment of indication outside the image plane. How to define a field frame is the same as the case as shown in FIG. 81, the length L of indication outside image plane L is approximately the same as the width of first field frame 72 in the vertical direction.

Figure 83:
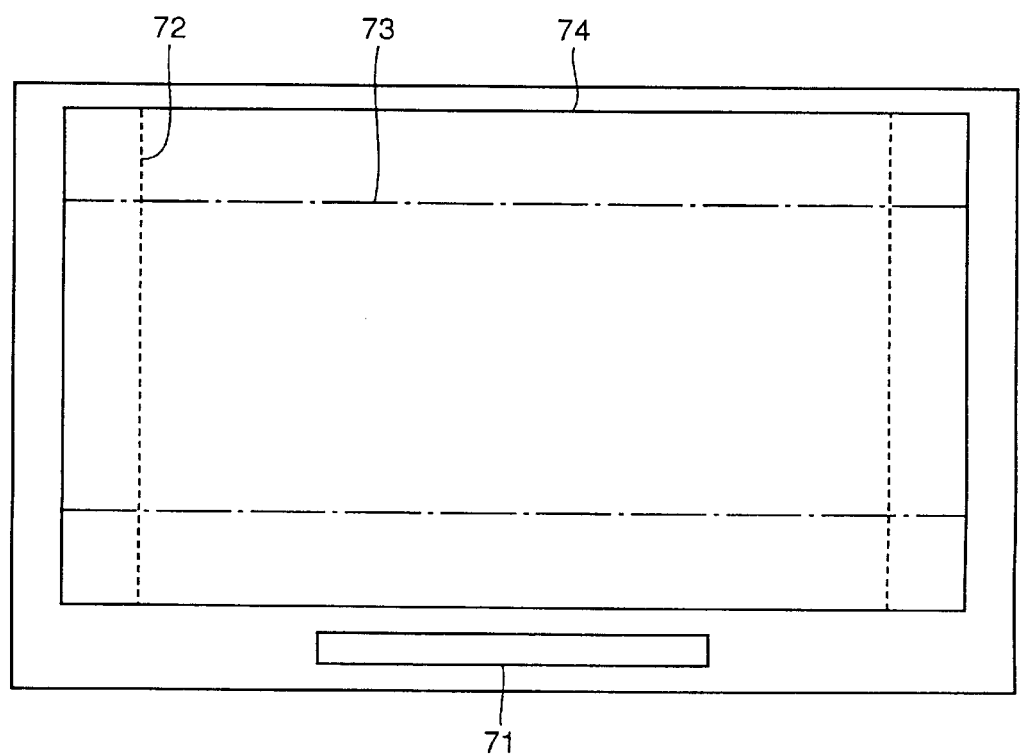

FIG. 83 shows another embodiment of indication outside image plane. How to define a field frame is the same as the case as shown in FIG. 81. The length L of indication outside image plane 71 in the horizontal direction is approximately the same as the width of second field frame 73 in the vertical direction.

If light is shielded or a marking line is provided in the two directions, in other words, the vertical and horizontal directions, providing the horizontal length of indication outside image plane to be approximately the same or shorter than the horizontal length of the field frame which has the shortest length in the horizontal direction permits a sufficient amount of information to be indicated as well as preventing the indication to be oversized in the horizontal direction of the field frame if switched to the shortest field frame in the horizontal direction, and therefore the user will not have a feeling of inconsistency. This also prevents erroneous operations.

Providing the horizontal length of indication to be shorter than the horizontal length of the field frame which has the shortest horizontal length permits the field frame to be larger than the size of indication outside the image plane, which gives the user a feeling of more dynamic observation within the field frame.

Further providing the horizontal length of the indication to be longer than the vertical length of the field frame which has the shortest vertical length permits a larger amount of information to be indicated.

Conditions for the above case preferably satisfies the following formula.

$$1.1Y2 < L < 0.9X2$$

wherein

L: the length of indication outside image plane in the horizontal direction

Y2: the vertical length of a field frame which has the shortest vertical length among field frames, and X2: the horizontal length of a field frame which has the shortest horizontal length among field frames.

If the lower limit of the above formula is exceeded, a sufficient amount of information cannot be indicated. If the upper limit is exceeded, the feeling of the image plane dynamically indicated in observation is spoiled.

Now, a description follows on one embodiment of a camera capable of switching a field frame among the H format field frame as a reference, the C format field frame and the P format field frame using a mechanical type switching mechanism. FIG. 84 shows an overview of such a camera incorporating a finder according to the embodiment. Camera K shown in FIG. 84 is a lens shutter type zoom camera having an autofocus (hereinafter AF) function and an automatic exposure adjustment (hereinafter referred to as AE) function.

Figure 84A:
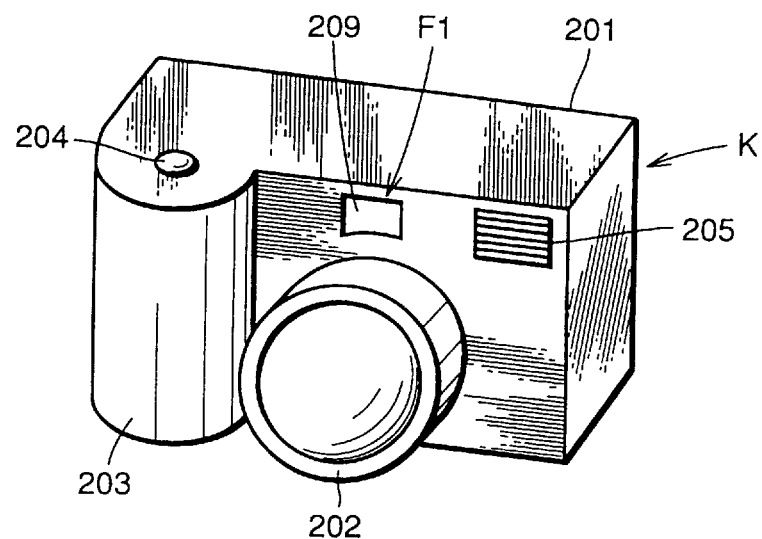
FIG. 84A is a perspective view schematically showing a camera incorporating a finder according to the present invention viewed from the front.

In FIG. 84A, the camera including a body 201, in the center of which a zoom lens 202 for photographing is mounted, and on one end of which, a grip portion 203 incorporating a film loading chamber, an auto rewinder (not shown) or the like is integrally formed with body 201. On an upper surface of grip portion 203, a shutter button 204 is provided. At the other end of body 201, a flash device 205 for stroboscope is provided.

Figure 84B:
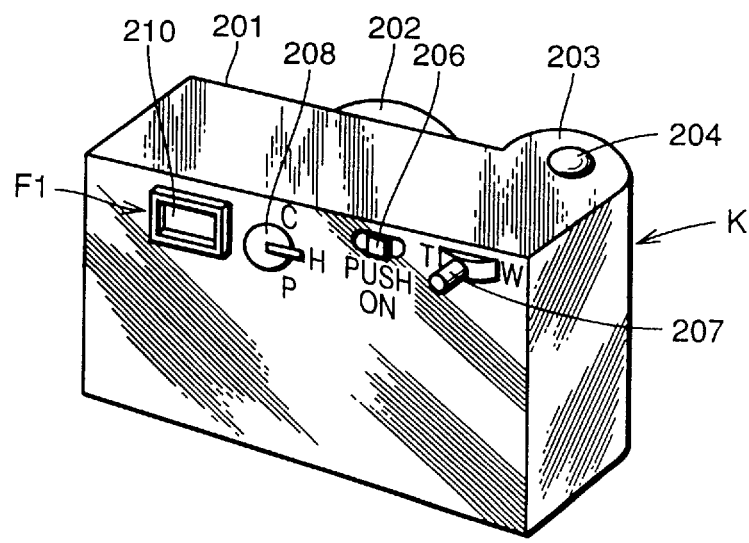
FIG. 84B is a perspective view showing the camera incorporating the finder according to the present invention viewed from the rear side.

As shown in FIG. 84B, on the rear side of body 201, a power supply switch 206, a zoom operation lever 207, and a field frame switching lever 208 are provided in parallel. Power supply switch 206 loaded in body 201 turns on/off a battery which supplies power to the driving, indication and photometric systems of camera K, and is formed of a push button for example. Zoom operation lever 207 can be pivotally operated clockwise and anti-clockwise, in order to select a magnification for an image in a step-free manner within the range of zooming including telephotography, standard and wide angles. Field frame switching lever 208 is pivotally operated during selecting any of the three kinds of field frames H, C and P.

Referring back to FIG. 84A, the objective window 209 of a finder F1 according to this embodiment is placed above zoom lens 202 for photographing. Thus providing the objective window 209 of finder F in a position close to zoom lens 202 permits the field of finder F to be as close as possible to the field of zoom lens 202.

Referring back to FIG. 84B, the eyepiece window 210 of finder F1 is positioned near the other end of body 201. Thus providing eyepiece window 210 prevents body 201 from interfering with the tip portion of the nose of the user as much as possible upon viewing finder F. Meanwhile, thus positioning eyepiece window 210 in opposite to shutter button 204 on the one side improves the operability of shutter button 204 during viewing finder F1.

However, since objective window 209 and eyepiece window 210 are largely separated from each other not only in the widthwise direction of camera K but also along the lengthwise direction, finder F incorporates an image inverting optics for inverting a real image formed by an objective optics and guiding the inverted image into an eyepiece optics. The objective optics is formed of a zoom optics operating together with the zooming operation of zoom lens 202, which permits the photographer to obtain a finder image substantially identical to the image formed on the surface of the film.

FIGS. 85 to 92 show essential components of the finder F of camera K shown in FIGS. 84A and 84B. Finder F according to this embodiment includes a real image type finder optics formed of an objective optics of a zoom optics, an inverting optics and an eyepiece.

Finder F is incorporated with an image inverting optics for inverting a real image formed by the objective optics and guiding the image into the eyepiece optics. The objective optics is formed of a zoom optics operating together with the zooming operation of zoom lens 202, which permits the photographer to obtain a finder image substantially identical to the image formed on the surface of the film.

Figure 85A:
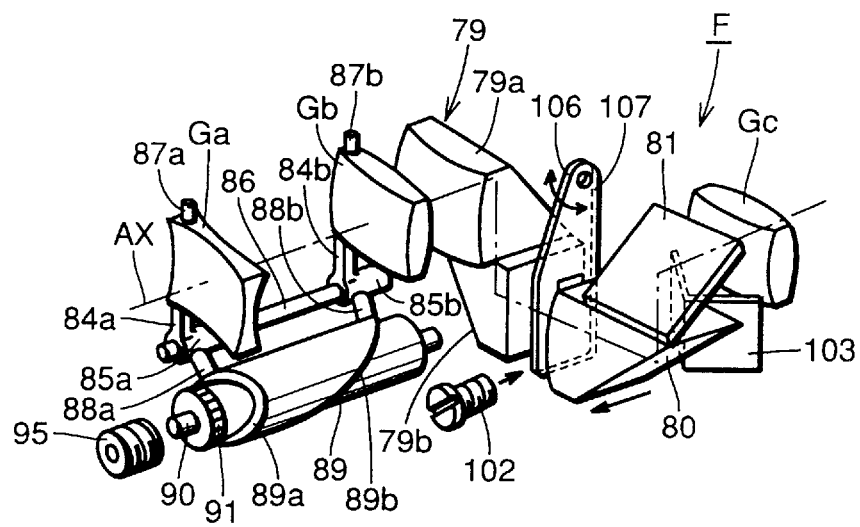
FIGS. 85A and 85B are exploded perspective views each showing the structure of a finder according to the present invention.
Figure 85B:
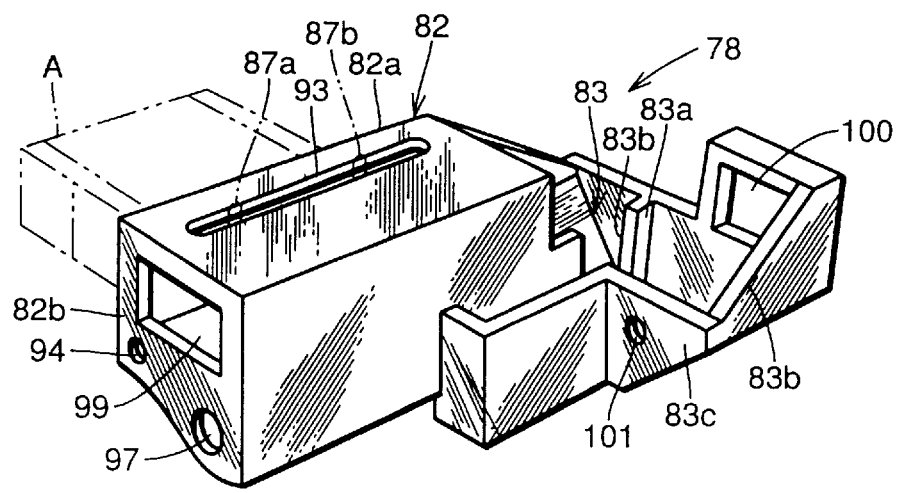

FIGS. 85A and 85B are exploded views of finder F. As illustrated, finder F according to this embodiment includes a real image type finder optics formed of an objective optics, an inverting optics and an eyepiece optics.

In a finder case 78, the objective optics, image inverting optics and eyepiece optics are mounted. The objective optic is two-system zoom optics formed of a first lens Ga and a second lens Gb, and is set to a magnification for an image in the range from about 2.5 to 3.0 power. The image inverting optics is formed of a Porro prism 79, a triangular prism 80 and a mirror 81. The eyepiece optics is formed of a single eyepiece lens Gc.

In the state in which the finder optics incorporated in finder case 78 is attached to body 201, incident light from objective window 209 is adjusted into an arbitrary magnification by the first and second lenses Ga and Gb of the objective optics as indicated by the optical axis AX in FIGS. 85A and 85B, then refracted by 90° downward by the first prism 79a of Porro prism 79, then refracted by 90° in the horizontal direction by second prism 79b to be guided into triangular prism 80, inverted by mirror 81 to form an erected image, which is guided into eyepiece lens Finder case 78 which may be formed by composite resin molding or metal processing includes a box shaped objective optics housing portion 82 having its bottom surface in FIG. 85 opened, and an image inverting optics attachment portion 83 formed approximately orthogonal to the tail of objective optics housing portion 82.

Figure 86:
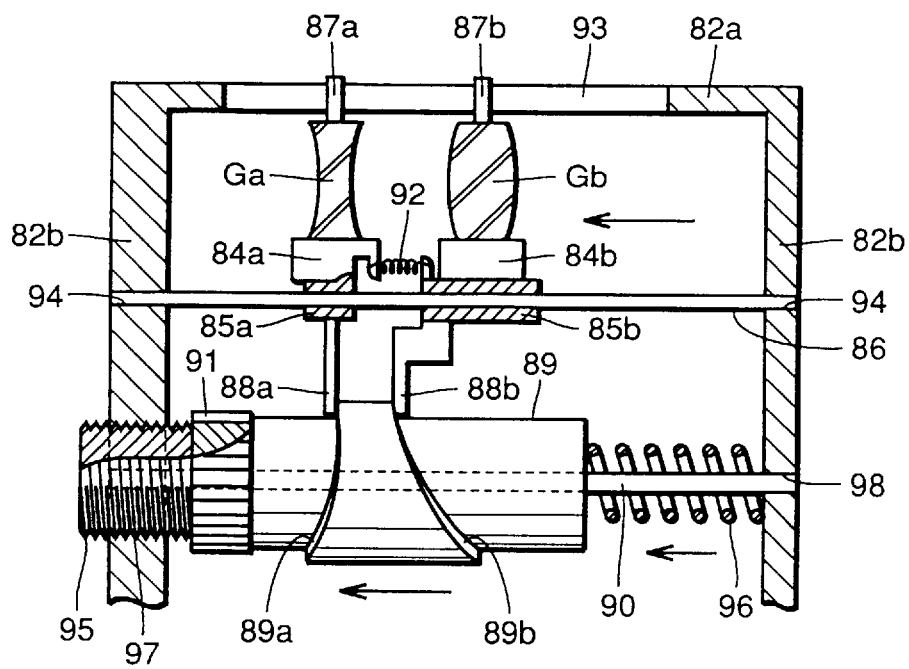
FIG. 86 is a cross sectional view schematically showing how the finder is assembled.

FIG. 86 shows an objective optics and a cam mechanism driving the optics. As shown in FIG. 86, first lens Ga forming the objective optics is fixed to a first lens holder 84a, and second lens Gb is fixed to a second lens holder 84b. At the lower end portions of these lens holders 84a and 84b, sliding tubes 85a and 85b are formed, which are slidably mounted to a common lens suspending shaft 86. Stopper bosses 87a and 87b projecting in the vertical direction are formed of first and second lens holders 84a and 84b.

First and second cam followers 88a and 88b are integrally provided to the sliding tubes 85a and 85b of first and second lens holders 84a and 84b, respectively. 89 represents a cam member formed of a bar cam for changing the magnification, which is mounted to a cam shaft 90 provided in parallel to lens suspending shaft 86. In the circumferential surface of cam member 89, a cam 89a for first lens and a cam 89b for second lens are formed, cams 89a and 89b abut upon first and second cam followers 88a and 88b, respectively.

In the figure, at the front end portion of cam shaft 90, a cam gear 91 for operating together with the driving system of camera K so as to be rotated together with magnification changing cam member 89 and the shaft, the driving force created by a motor built in camera K or by rotating zoom operation lever 7 is transmitted to magnification changing cam member 89 through the driving system of camera K and cam gear 91. Note that cam gear 91 may be formed integrally with or separately from magnification changing cam member 89, or cam gear 91 may be operated together with the operation driving system, and manually rotated. A tension spring 92 is adjusted between first and second lens holders 84a and 84b, and the urging force of tension spring 92 causes first and second cam followers 88a and 88b to abut upon cams 89a and 89b for first and second lenses in correct positions.

The objective optics is inserted from under the objective optics housing portion 82 of finder case 78, stopper bosses 87a and 87b for lens holders 84a and 84b are slidably inserted into an elongate hole 93 formed in the upper wall 82a of objective optics housing in portion 82, and shaft supporting holes 94, 94 perforated in the front and rear side walls 82b, 82b of objective optics housing in portion 82 support lens suspending shaft 86, so that first and second lenses Ga and Gb are supported and capable of linear movement back and forth.

A cam position adjusting screw 95 which will be described later is mounted at the front end of cam shaft 90, and a cam position adjusting compression spring 96 is provided at the rear end, which are supported by screw hole 97 and support hole 98 perforated in the side walls 82b, 82b of the objective optics housing portion. Thus accommodating the objective optics into housing portion 82 permits cam position adjusting compression spring 96 to abut upon the rear side wall 82b of objective optic housing portion and the rear end surface of magnification changing cam member 89, thereby causing magnification changing cam member 89 to abut upon cam position adjusting screw 95 through cam gear 91.

Thus, in the step of assembling, the amount of advancing/withdrawing from cam position adjusting screw 95 from screw hole 97, is adjusted to adjust the positions of first and second lenses Ga and Gb in the entire finder optics, and therefore the diopter of the entire finder optics can be appropriately adjusted. More specifically, during adjusting the diopter of the finder optics, the position of any lens included in the optics may be corrected, while according to the present embodiment, the position of the entire cam shaft 90 is adjusted along the optical axis in order to adjust the positions of first and second lenses Ga and Gb on the optical axis, which is performed by advancing/withdrawing cam position adjusting screw 95, and therefore the diopter can be accurately adjusted with a simple mechanism. Note that 99 is a window portion to be faced against objective window 209 of body 201.

Figure 87:
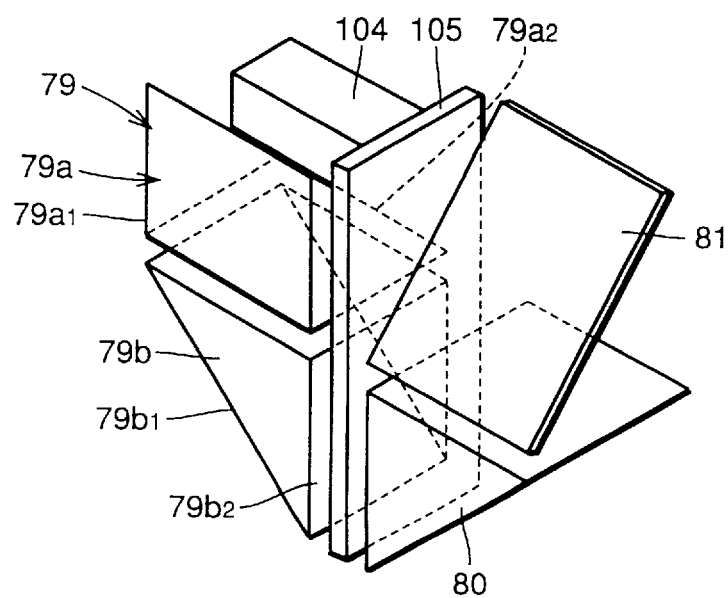
FIG. 87 is a perspective view schematically showing the structure of an image inverting optics.

FIG. 87 schematically shows the arrangement of components of the image inverting optics. As shown in FIGS. 85 and 87, Porro prism 79 formed of first prism 79a and second prism 79b joined upon each other is fitted and attached into the image inverting optics attachment portion 87 of finder case 78 from the above. Triangular prism 80 is fitted in a position opposite to the second prism 79b of Porro prism 79 across a partition wall 83a in image inverting optics attachment portion 83. Mirror 81 is fixed so as to follow the inclined upper surface of inclined wall 83b formed at the right end portion of image inverting optics attachment portion 83. Eyepiece lens Gc is fixed to an eyepiece lens attachment window 100 formed at an end of finder case 78 facing mirror 81.

In the image inverting optics incorporated in finder case 78, light incident along optical axis AX from objective optics comes into the vertical surface 79a1 of first prism 79a in Porro prism 79, then refracts toward the vertical direction at a surface 79a2 inclined by 45°, then refracts toward the horizontal direction by the surface 79b1 inclined by 45° of second prism 79b, comes into triangular prism 80 through a surface 79b2 forming a vertical image, a rear image, and then reaches mirror 81 from triangular prism 80 to be inverted and form an erected image, which is viewed by the photographer through eyepiece lens Gc.

Finder F in this embodiment adjusts the position of triangular prism 80 in the step of assembling in order to adjust the indication ratio. As well known, the ratio represents the ratio of a portion corresponding to the range which can be covered by zoom lens 2 for photographing in the field of finder F. In order to appropriately adjust the ratio, the inverting optics after the vertical image forming surface 79b2 of second prism 79b, in other words triangular prism 80 is held movably in parallel to vertical image forming surface 79b, in other words movably in the vertical direction relative to the optical axis, and triangular prism 80 is moved to adjust the ratio.

More specifically, the front side wall 83c of image inverting optic attachment portion 83 incorporating triangular prism, 80 is provided with a screw hole 101, which is threadably provided with a prism position adjusting screw 102. Interposed between triangular prism 80 and the rear wall 78a of finder case 78 is a plate spring 103 which urges triangular prism 80 forward, and triangular prism 80 is held under pressure between prism in position adjusting screw 102 and plate spring 103. If the ratio is adjusted during assembling, the amount of advancing/withdrawing prism position adjusting screw 102 is adjusted to slightly move triangular prism 80 in order to set markings present in the finder field of the eyepiece optics in appropriate positions.

In this case, thus adjusting the amount of advancing/withdrawing prism position adjusting screw 102 moves only triangular prism 80, the positional relation relative to mirror 81 held in a stationary state is slightly shifted, but the area of reflective surface of mirror 81 is set large enough to cover the effective surface of triangular prism 80, and therefore the inverting optics will not be adversely affected.

In finder F according to this embodiment, there is provided a field frame switching mechanism for switching the field of finder F between the H, C and P formats in response to the operation of field frame switching lever 208. The field frame switching mechanism includes a driving portion 104 operating in response to field frame switching lever 208, and a portion 105 operated in response to driving portion 104 to switch the field within finder F. Referring back to FIG. 85, provided between the image forming surface 79b2 of second prism 79b and triangular prism 80 are the first and second field frame pieces 106 and 107 of operated portion 105 of the field frame switching mechanism which can be advanced/withdrawn in the direction orthogonal to the optical path.

The image inverting optics mounted in finder case 78 includes two sets groups of three triangular prisms and inclined mirror 81 in a collected manner, and therefore spaces Sa are necessarily created between the top surface of body 201 and the inclined upper surfaces of prism 12a and 14. Meanwhile, operated portion 105 of the field frame switching mechanism is as will be described later interposed between Porro prism 79 and first triangular prism 80.

Figure 88:
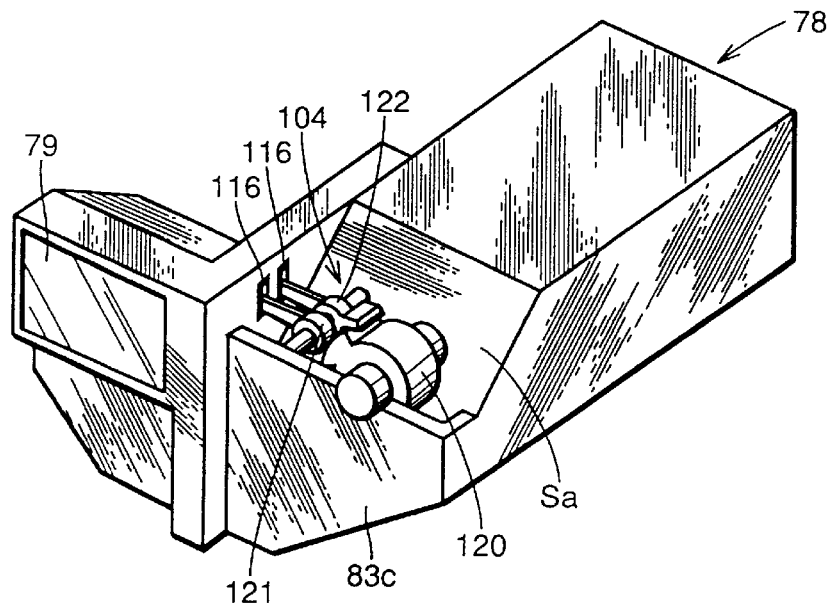
FIG. 88 is a perspective view showing how a field frame switching mechanism driving portion is attached.

In view of this structure, in this embodiment, driving portion 104 is provided taking advantage of spaces Sa. More specifically, as shown in FIG. 88, the driving portion 104 of the field frame switching mechanism is provided to be within space Sa on mirror 81. Operated portion 105 is formed to move entirely together with triangular prism so as to follow the indication ratio adjusting operation by prism position adjusting screw 102, so that the field frame will not be shifted after the indication ratio is adjusted. Field frames other than the reference field frame may be adjusted simultaneously.

Figure 89:
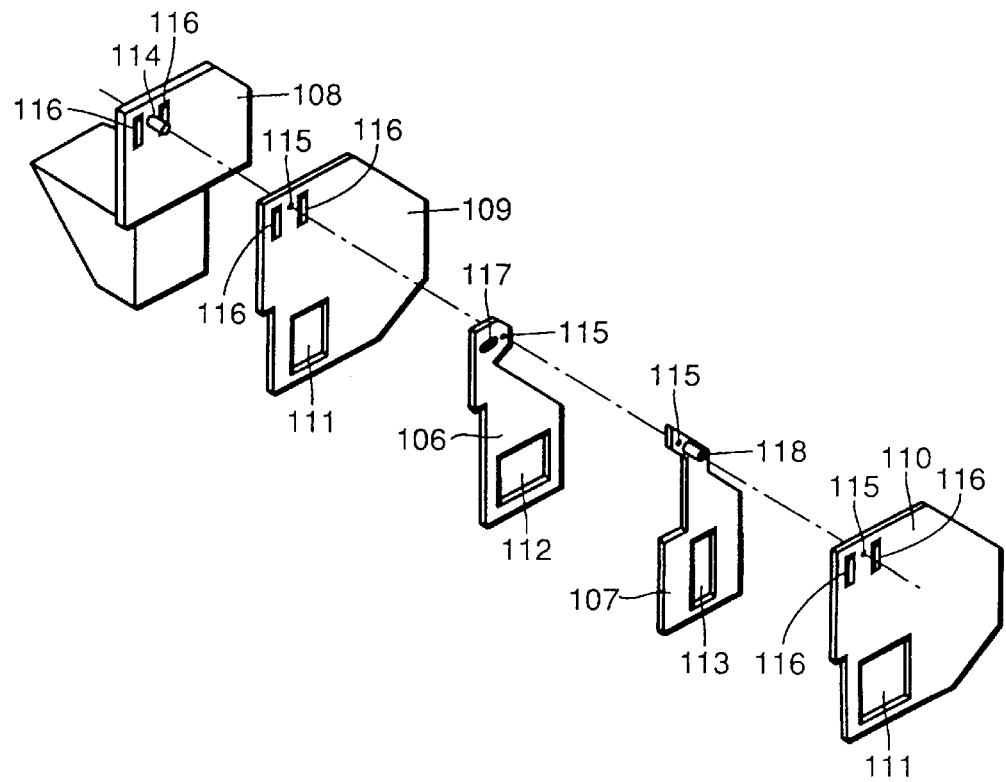
FIG. 89 is an exploded perspective view showing how the field frame portion of the field frame switching mechanism is attached.

FIG. 89 shows how a C format mask member 106 and a P format mask member 107 are attached. In FIG. 89, a plate 108 is attached fixedly on the second prism 79b of Porro prism 79, and left and right fixing frame pieces 109 and 110 as first and second members are provided on both sides of mask members 106 and 107 with these mask members therebetween. Note that stage plate 108 may be formed integrally with second prism 79b.

left and right fixing frame pieces 109 and 110 have a first field restriction window 111 corresponding to the H format field frame as a reference field frame as shown in FIGS. 16A to 16C at their lower end portions facing the image forming surface 79b2 of second prism 79b. C format mask member 106 has a second field restriction window 112 marked corresponding to the C format field frame at its lower end facing first field restriction window 111, and P format mask member 107 has a second field restriction window 113 marked corresponding to the P format field frame at its lower end.

A supporting point pin 114 functioning as a supporting point for pivotal movement is provided at the upper end portion of stage plate 108 on the side opposite to each of frame pieces 106, 107, 109 and 110. Mask members 106 and 107, and left and right fixing frame pieces 109 and 110 are provided with a pin insert hole 115, inserting supporting point pin 114 through these pin insert hole 115 attaches frame pieces 106, 107, 109 and 110 to stage plate 108. Left and right fixing frame pieces 109 and 110 have their contour portions restricted by the inner wall of finder case 78 for fixation, and mask members 106 and 107 are suspended swingably around supporting point pin 114.

On both sides of the supporting pin 114 of plate 108 and on both sides of the pin insert holes 115 of left and right fixing frame pieces 109 and 110, elongate rectangular holes 116 for inserting first and second swinging levers 126 and 127 (see FIG. 90) are formed. Note that each elongate hole 116 has its width set just to tolerate the movement of operated portion 105 by the adjustment of the indication rate, with swinging levers 126 and 127 being penetrated through elongate holes 116.

A transverse elongate hole 117 for inserting first swinging lever 126 is formed on the front side of pin insert hole 115 of C format mask member 106, while an inclined elongate hole 118 for inserting second swinging lever 127 is formed on the rear side of the pin insert hole 115 of P format mask member 107.

Figure 90:
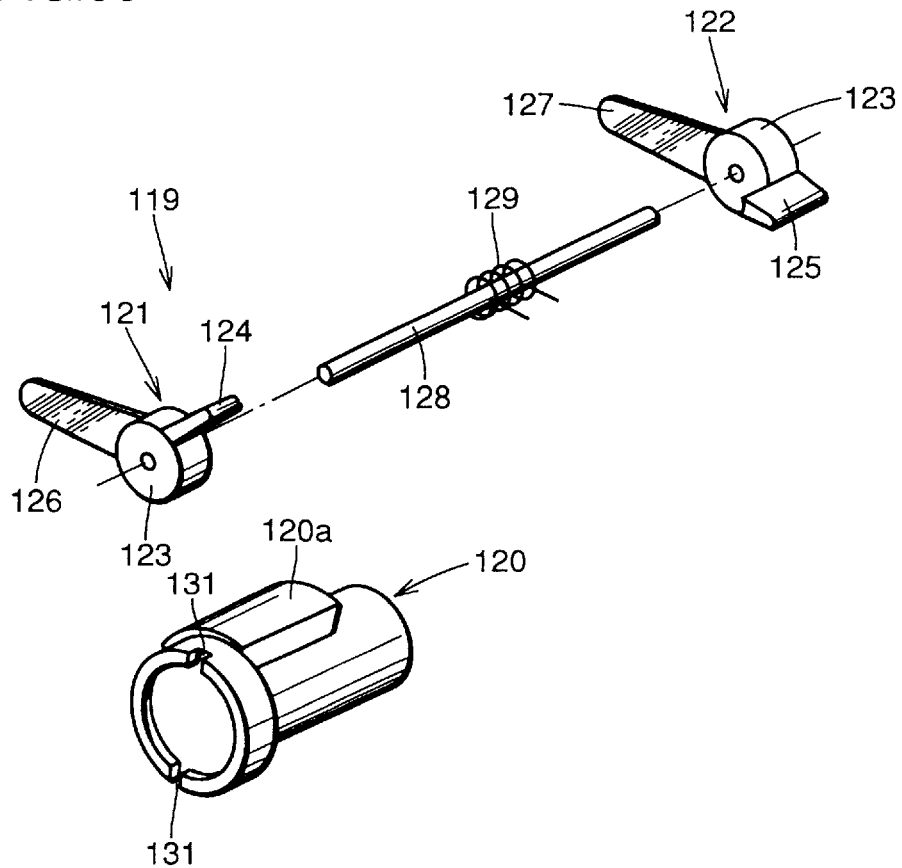
FIG. 90 is an exploded perspective view showing the structure of a field frame switching mechanism driving portion.
Figure 91:
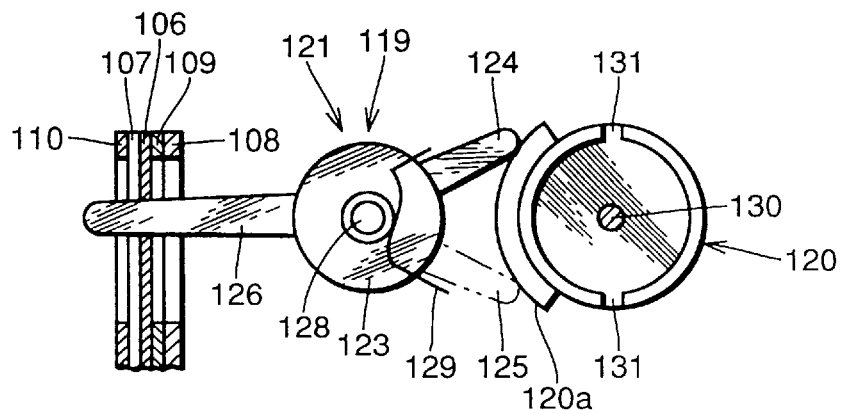
FIG. 91 is a partly cut away side view showing how a field frame switching mechanism is assembled.

FIG. 90 shows the structure of the driving portion 104 of the field frame switching mechanism, while FIG. 91 shows how the field frame switching mechanism is assembled. In these figures, 119 represents a swinging switching mechanism, and 120 is a field frame switching cam functioning as a cam member for operating swinging switching mechanism 119. Swinging switching mechanism 119 is provided with first and second swinging members 121 and 122 functioning as rotating levers. Cam followers 124 and 125 functioning as arms to contact with the cam mount 120a of field frame switching cam 120 and swinging levers 126 and 127 are integrally provided at both portions 123, 123 of swinging members 121 and 122, respectively.

In swinging switching mechanism 119, the boss portions 123, 123 of swinging members 121 and 122 are faced opposite to each other and inserted rotatably through a common supporting shaft 128, while the cam followers 124 and 125 of swinging members 121 and 122 are urged in the closing direction by the function of a clicking spring 129 fitted into supporting shaft 128.

The swinging lever 126 of first swinging member 121 is inserted through stage plate 108, the front side elongate hole 116 of left fixing frame piece 109, the transverse hole 117 of C format mask member 106, and the front side elongate hole 116 of right fixing frame piece 110, while the swinging lever 127 of second swinging member 122 is inserted through stage plate 108, the rear side elongate hole 116 of left fixing frame piece 109, the inclined elongate hole 118 of P format mask member 107, and the rear side elongate hole 116 of right fixing frame piece 116, and each of the swinging levers is urged by clicking spring 129 in a manner and are pressed to the advancing direction, in other words toward the position at which field restriction window 112 or 113 overlaps first field restriction window 111.

Thus, since the direction of urging by clicking spring 129 corresponds to the advancing direction, mask members 106 and 107 both advance, and if stopper means is provided at an appropriate position, the positions of mask members 106 and 107 will not be shifted within the field.

Meanwhile, field frame switching cam 120 having a rotating shaft 130 in the center includes a cam mount 120a on the circumferential surface of the tube, and a marking line engaging portion 131 as an operated portion to be engaged with field frame switching lever 208 on its one end, while the circumferential surface having cam mount 120a is rotatably placed at the position opposite to swinging switching mechanism 119 in contact with the cam followers 124 and 125 of swinging members 121 and 122.

Figure 92A:
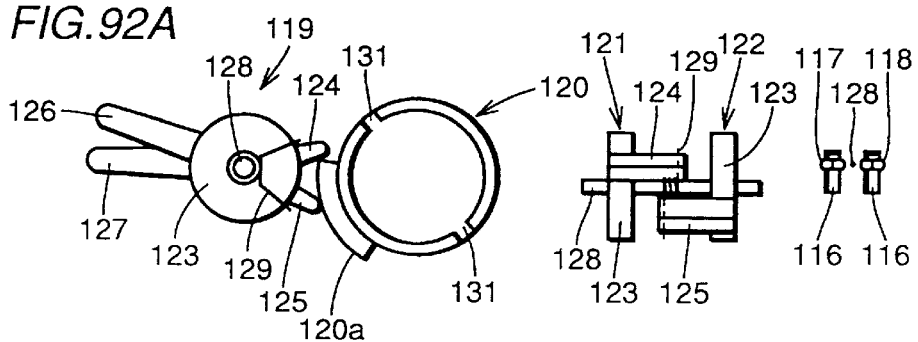
FIGS. 92A to 92C each include views for use in illustration of the operation of a field frame switching mechanism, in which FIGS. 92A to 92C correspond to first to third image plane size states, respectively.
Figure 92B:
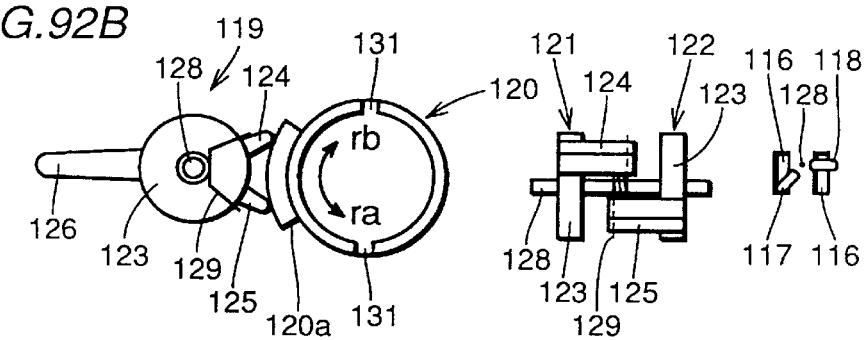
Figure 92C:
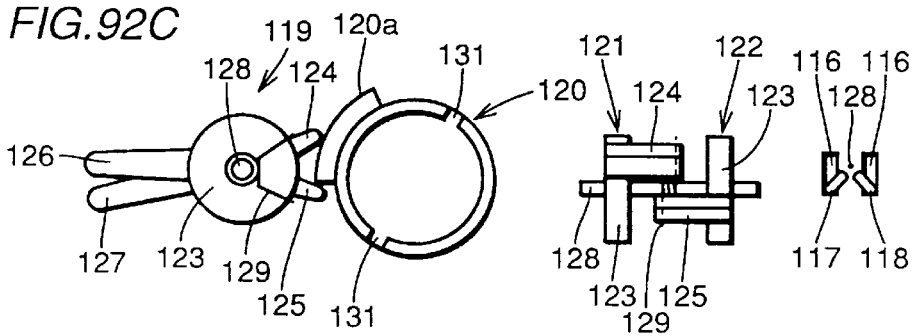

FIGS. 92A to 92C show the operation of the field frame switching mechanism. FIG. 92A shows the state of the field frame switching mechanism when the field frame is switched to the C format field frame by setting field frame switching lever 208 as shown in FIG. 84B to the position of C. FIG. 92B shows the state of the field frame switching mechanism when the field frame is switched to the H format field frame as a reference field frame by setting field frame switching lever 208 to the position of H. FIG. 92C shows the state of the field frame switching mechanism when the field frame is switched to the P format field frame by setting field frame switching lever 208 to the position of P. Note that each figure in the left shows a side, the figure in the center the front of the field frame switching piece, and the figure in the right of the state of the hole of a mask member viewed from the front.

In the state of the reference field frame in FIG. 92B, the cam followers 124 and 125 of first and second swinging members 121 and 122 are on the cam mount 120a of field frame switching cam 120, and the switching levers 126 and 127 of members 121 and 122 are withdrawn against the urging force of clicking spring 129 to the position at which members 126 and 127 overlap. As switching levers 126 and 127 thus withdraw, P format mask members 106 and 107 are withdrawn out of the field, stage plate 108 and the first field restriction windows 111 of left and right fixing frame pieces 109 and 111 are opened, and the filed viewed from eyepiece window 10 corresponds to the H format field frame.

The state of the H format field frame as a reference field frame is switched by moving field frame switching lever 208 to the position of C, then the movement of field frame switching lever 208 is transmitted onto a line engaging portion 131, field frame switching cam 120 is rotated in a first direction, the direction along arrow ra in solid line in FIG. 92B, then as shown in FIG. 92A, only the cam follower 124 of first swinging member 121 is detached from the cam mount 120a of field frame switching cam 120, and the swinging lever 126 of first swinging member 121 is rotated by the urging force of clicking spring 129. During the regaining operation of swinging lever 126, C format mask member 106 comes into the field, second field restriction window 112 overlaps first field restriction window 112, and the field viewed from eyepiece window 10 corresponds to the C format field frame.

When field frame switching lever 208 is switched to the position of P from the state of the H format field frame, the movement of field frame switching lever 208 is transmitted onto marking line engaging portion 131, field frame switching cam 120 rotates in a second direction, in the direction of arrow rb in dotted line in FIG. 92B, only the cam follower 125 of second swinging member 121 is detached from the cam mount 120a of field frame switching cam 120 as shown in FIG. 92C, and the swinging lever 127 of second swinging member 122 is rotated by the urging force of clicking spring 129. During the regaining operation of swinging lever 127, P format mask member 107 comes into the field, third field restriction window 113 overlaps first field restriction window 111, and the field viewed from eyepiece window 10 corresponds to the P format field frame.

In the embodiments described in conjunction with FIGS. 84 and on the H format field frame is utilized as a reference field frame, a variation of the embodiment as follows implements a field frame switching mechanism using the C format field frame as a reference field frame. More specifically, second field restriction window 112 formed in C format mask member 106 is changed to first field frame restriction window 111 corresponding to the H format field frame, first field restriction window 111 formed at left and right fixing frame pieces 109 and 110 is changed to second field frame restriction window 112 corresponding to the C format field frame. At the same time, signs "C" and "H" indicated around field frame switching lever 208 are exchanged. Thus, the field frame switching mechanism using the C format field frame as a reference field frame can be implemented. In other words, the C format field frame is indicated as a reference field frame, switching field frame switching lever 208 to the position of "H" and the position of "P" permits mask members 106 and 107 come into the optical path of the finder, and the H format field frame and the P format field frame are indicated. In this case, first to third field frame restriction windows 111 to 113 have the same side length corresponding to the lengthwise width of the photographing format. Accordingly, if the H format field frame or the P format field frame is indicated, the magnification of the finder optics is changed toward wide angles in order to match the lengthwise width of the image of the object to the field frame.

In the embodiment described in conjunction with FIGS. 84 and on, two kinds of field frame switching operations relative to the reference field frame are conducted mechanically using mask members 106 and 107, but one of mask members 106 and 107 may be of liquid crystal type. In that case, the liquid crystal type field frame member does not have to be moved and may be fixed in the optical path, and therefore the field frame switching mechanism may be simplified. The liquid crystal needs only indicate one field frame, the number of segments of liquid crystal may be small. Therefore, such a liquid crystal device can be implemented inexpensively.

(2) Second Embodiment

Now, a second embodiment of the invention will be described in conjunction with the accompanying drawings.

In the second embodiment, the formats are the same as those in the first embodiment.

Figure 93:
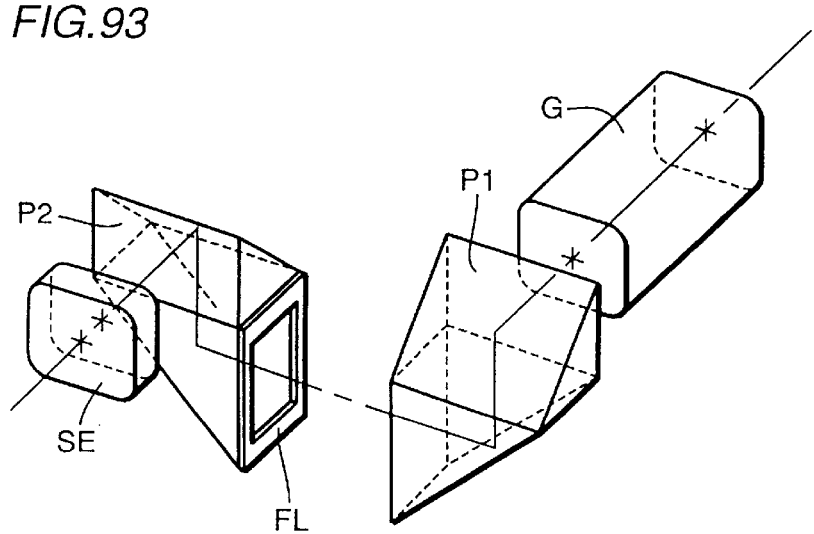
FIG. 93 is a view schematically showing the structure of a finder portion in a camera according to a second embodiment of the invention.

FIG. 93 shows a real image type finder structure in the second embodiment. G represents a group of objective lenses, P1 and P2 are Porro prisms for inverting an image in the vertical and horizontal directions, and SE is an eyepiece lens for enlarging a real image formed by the objective lens. The image of an object is formed between P1 and P2 by objective lens group G. The surface of the real image created by objective lens group G is set in the range from the exit surface of P1 to the input surface of P2. An indication body FL having a field frame is provided in the vicinity of the surface of real image. In this embodiment, indication body FL is formed of a photoelectric element, and provided between Porro prisms P1 and P2. In this embodiment, liquid crystal is employed as such a photoelectric element, but electrochromics may be applied.

Figure 94A:
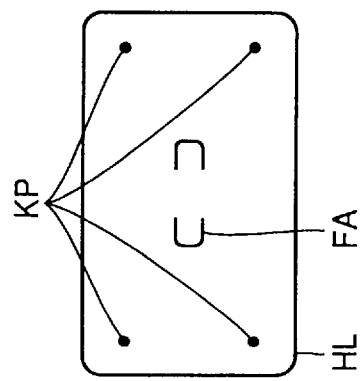
FIGS. 94A to 94C are views showing indications within the finder according to a variation A of the second embodiment of the invention.
Figure 94B:
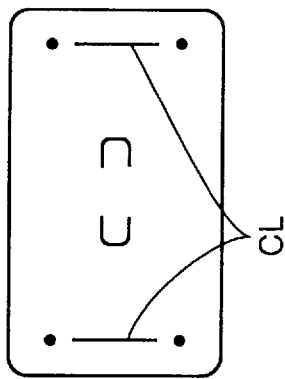
Figure 94C:
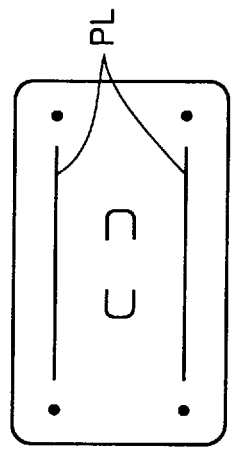

FIGS. 94A to 94C show the states of H, C and P formats as indicated. With respect to the H format field frame, indications KP representing the crossing points of C and P formats are indicated in dots. Such indication in dots of crossing point KP in the H format alleviates eye sore in photographing. Crossing points KP are fixedly indicated and formed of an electrode pattern of liquid crystal in these embodiments, but a metal film may be deposited onto the surface of liquid crystal glass and patterned. A field frame HL indicating the H format is patterned by depositing a metal film onto the surface of liquid crystal glass, but a separate mask may be provided on the liquid crystal glass. Indication CL in the boundary region of C format and indication PL in the boundary region of P format are indicated by liquid crystal as a line pattern connecting the crossing points when each format is selected. According to the invention, crossing points KP are indicated in a fixed manner, which format to select becomes obvious. The boundary region corresponding to a set format is clearly shown, and a format area will not be mistaken, promising always secured photographing.

Figure 95A:
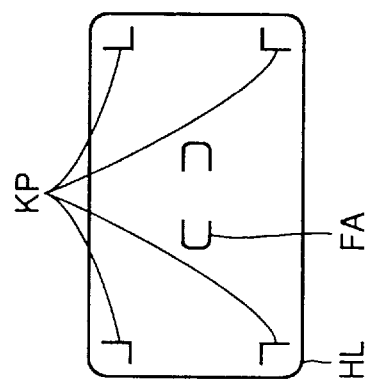
FIGS. 95A to 95C are views showing indications within a finder according to a variation B of the second embodiment of the invention.
Figure 95B:
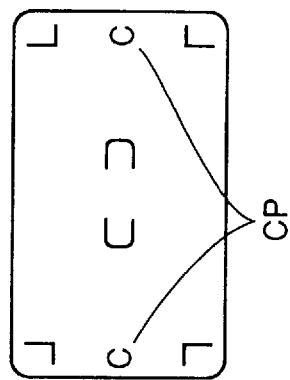
Figure 95C:
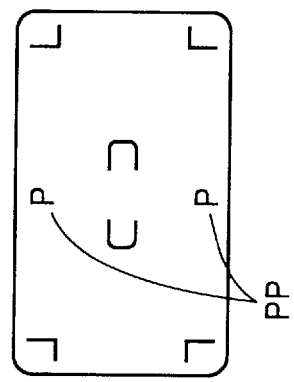

FIGS. 95A to 95C show a variation B of the second embodiment. With respect to the H format field frame, indications KP of the crossing points of the C and P formats are indicated by L shaped lines with their right angles facing toward inside. If the C format is selected, a pattern C representing the C format is indicated on both sides of the image plane outside the field frame in the C format, when the P format is selected, a pattern P representing the P format is indicated on the top and bottom of the image plane outside the field frame in the P format. In this case, letters C and P are indicated using photoelectric elements, and crossing point indications KP are patterned by depositing a metal film onto the surface of the photoelectric elements. As such photoelectric elements, liquid crystal or electrochromics may be employed. If the C or P format is selected, letter C or P is indicated outside the field frame in each format on the image plane, and it is easy to know which format is selected and that the area without any indication corresponds to the field frame, thus improving the ease of handling the device. As such a pattern indicated outside the field frame on the image plane, patterns for visually indicating other functions may be indicated in addition to such letters as CC and PP. Patterns CC and PP may be indicated in different colors. Boundary region indications CL and PL described in the first embodiment may be indicated simultaneously with pattern indications CC and PP.

Figure 96C:
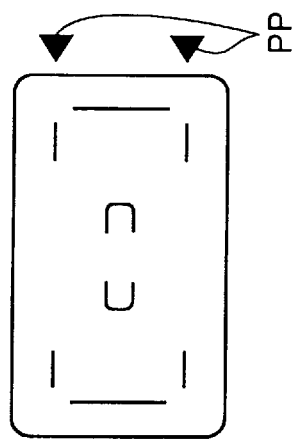
FIGS. 96A to 96C are views showing indications within a finder according to a variation C of the second embodiment of the invention.
Figure 96B:
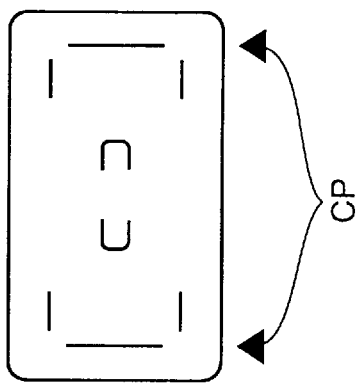
Figure 96A:
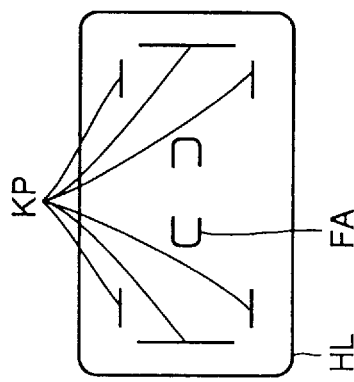

FIGS. 96A to 96C show a variation C of the second embodiment of the invention. With respect to the H format field frame, patterns KP representing the crossing points of the C and P formats are indicated in orthogonal directions without crossing, and the right angles are indicated by two lines facing toward inside. These lines are formed by depositing a metal film on the surface of prism. Two light emitting elements are separately provided to indicate the frames of C and P formats outside the image plane, one of light emitting elements is emitted in response to a selection of format, and the frame of the selected format is indicated. In this embodiment, although the light emitting elements are arranged under and outside the image plane, they may be arranged above the image plane.

Figure 97C:
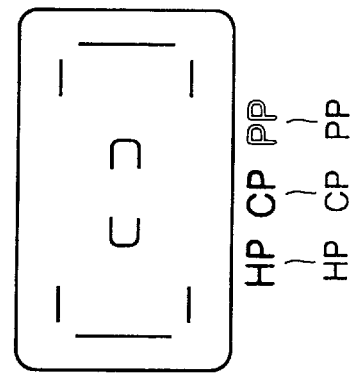
FIGS. 97A to 97C are views showing indications within a finder according to a variation D of the second embodiment of the invention.
Figure 97B:
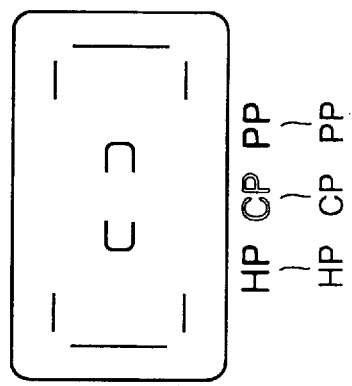
Figure 97A:
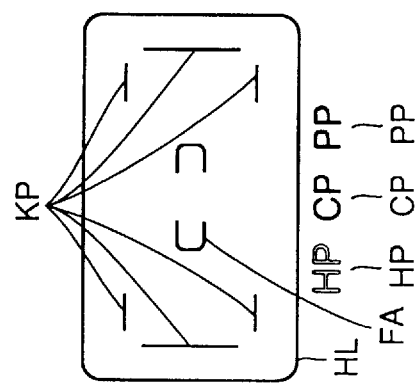

FIGS. 97A to 97C show a variation D of the second embodiment. In these embodiments, patterns KP are formed similarly to the field frame as shown in FIGS. 96A to 96C, pattern indications HP, CP and PP representing the H, C and P formats are arranged outside the image plane. When H, C or P format is selected, pattern HP, CP or PP corresponding to a selected format emits light. The format can be more easily recognized if the light emitting indication bodies may be in different colors for recognition.

Figure 98C:
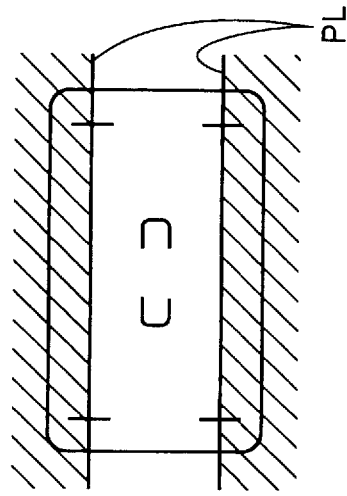
FIGS. 98A to 98C are views showing indications within a finder according to a variation E of the second embodiment of the invention.
Figure 98B:
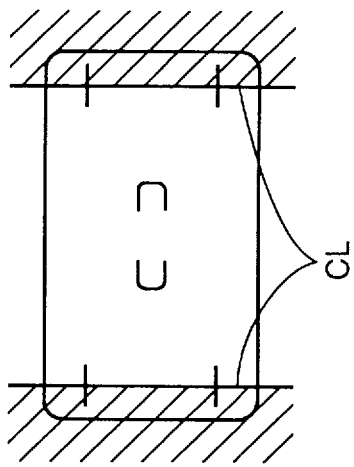
Figure 98A:
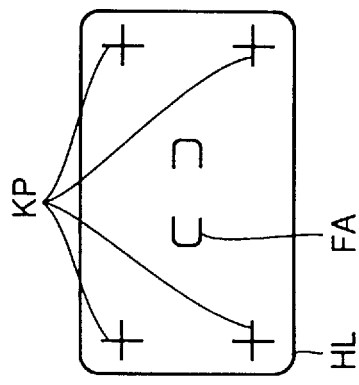

FIGS. 98A to 98C show a variation E of the second embodiment. In these embodiments, masks are mechanically inserted. With respect to the H format field frame, the crossing points KP of the C and P formats are indicated by two lines. These lines are formed by depositing a metal film on the surface of prism. Boundary region indications CL and PL are switched by inserting a light shielding mask into the finder upon selecting the C or P format. Since the mask is entirely shielded from light, the boundary is clearly recognized and the area of the selected format can be accurately recognized.

Figure 99:
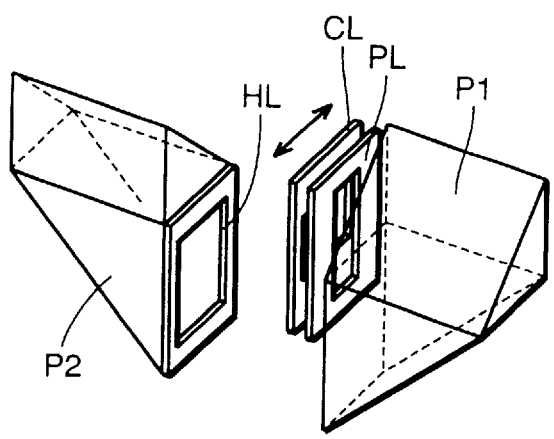
FIG. 99 is a view schematically showing a finder according to a variation E of the second embodiment.

FIG. 99 shows the structure for implementing the indications as shown in FIGS. 98A to 98C. Field mask HL representing the H format is fixed between finder prisms P1 and P2, and CL or PL are inserted within the optical path to indicate the boundary region upon switching between the C and P. Crossing point indications KP may be indicated by marking the surface of finder prism P1 or P2. In this example, the structure of the real image type finder has been described, the same indication may be applied to a virtual image type finder.

A specific structure of a finder in a camera according to the second embodiment are the same as those in the first embodiment, and therefore a detailed description thereof is not provided.

(3) Third Embodiment

Now, a third embodiment of the invention will be described. In the third embodiment, the formats are the same as those in first and second embodiments.

Figure 100A:
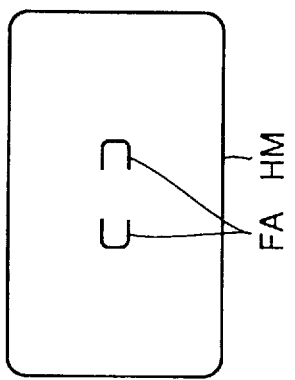
FIGS. 100A to 100C are views each showing a finder field corresponding to each print area format according to a third embodiment of the invention.
Figure 100B:
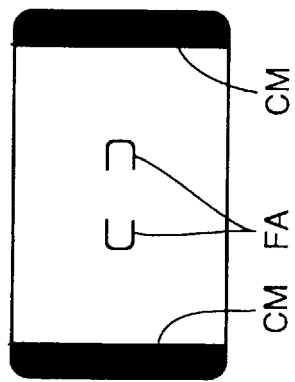
Figure 100C:
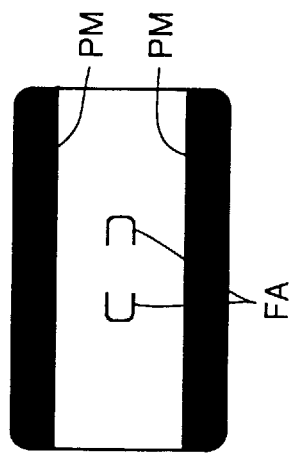

FIG. 100A to 100C show the finder field corresponding to each format. FIG. 100A shows a finder field corresponding to the H format having a maximum image plane diagonal length. In FIG. 100A, HM represents a field mask as a first field restriction member for indicating the H format. FIG. 100B shows a finder field corresponding to the C format having a shorter side as long as the H format and the second largest image plane diagonal length. CM represents a field mask as a second field restriction member for indicating the C format. FIG. 100C shows a finder field corresponding to the P format having a lengthwise side as long as the H format and the shortest image plane diagonal length. PM shows a field mask as a third field restriction member for indicating the P format. A number of pieces of information must be indicated within the finder in addition to field frames and one such information is measuring distance area mark FA.

The structure of a real image type finder according to the third embodiment is the same as that of the second embodiment as shown in FIG. 93, and therefore a detailed description thereof is not provided here.

Figure 101:
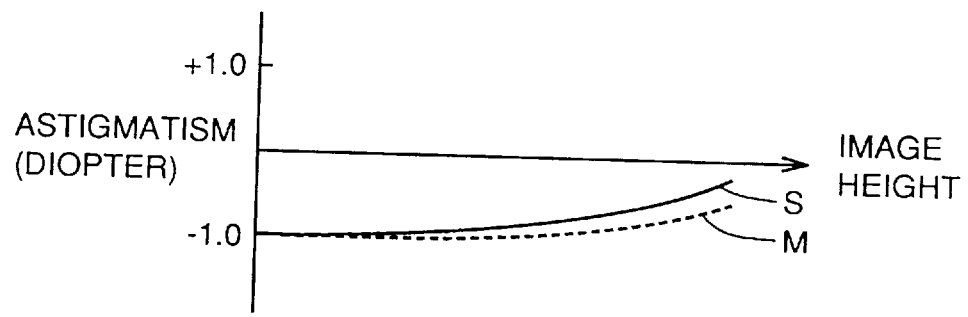
FIG. 101 is a graph showing the astigmatism of an eyepiece lens.

FIG. 101 shows the astigmatism of an eyepiece lens SE. A general eyepiece lens has positive power, and therefore the astigmatism as shown in FIG. 101 is exhibited. The ordinate represents diopter and the abscissa represents image height. The image quality of an object is determined by the combination of the optical properties of an objective lens and an eyepiece lens, but how indication within the image plane or a field frame looks is determined by the optical performance of the eyepiece lens. S represents a sagittal image surface and M represents a meridional image surface. The diopter is usually shifted between the central position and the peripheral image height. The diopter of the average image surface of S and M is shifted more in the positive direction as the image height is higher than the center. If a field frame formed by a field mask is placed matched to the central position, the position of the frame corresponds to the peripheral image height, and therefore the boundary region of the frame becomes shifted from the center in diopter. For a field frame having an image height more apart from the center, the diopter is easily matched by shifting the frame from the center in the direction of the optical axis. If an average image surface (average of S and M) at a high image height at an eyepiece lens position is shifted toward the positive diopter direction from the center, the field frame may be shifted toward the eyepiece side in the optical axis direction from the central position to be closer to the central diopter and the field frame looks clear. Conversely, if the average image surface of the eyepiece is shifted toward the negative diopter direction, the field frame may be shifted toward the objective lens from the central position in the optical axis direction. The central position is the position of a real image formed by the objective lens, and indication information within the image plane (indication in the center) is placed at a location in coincidence with the central position.

Figure 102:
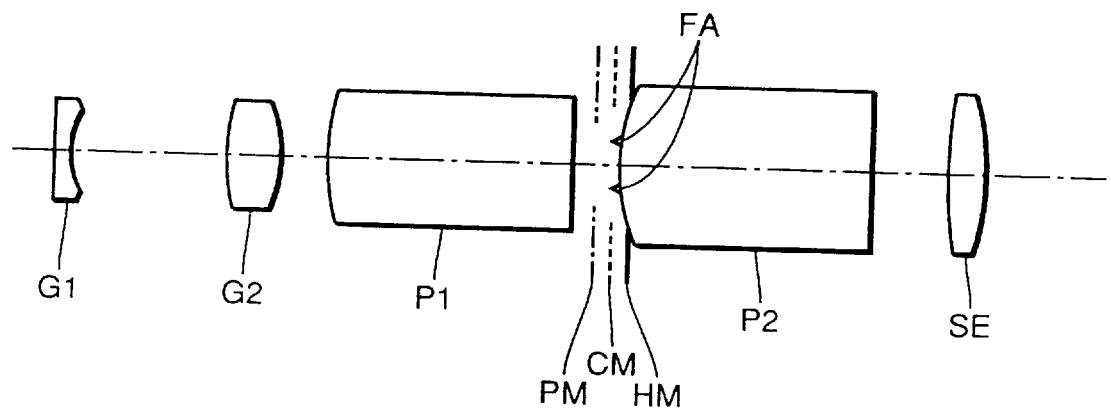
FIG. 102 is a view showing a position of a field mask in the finder according to the third embodiment of the invention.

FIG. 102 shows a specific placement of field masks. G1 and G2 forms an objective lens group, and P1 and P2 shows the prisms of the inverting system in a developed state. In this embodiment, a real image by the objective lens forms on the surface of P2 on the objective side (incident surface) thus, the real image surface is positioned near to the surface of P2, such that the spacing between the eyepiece lens and the real image surface is shortened, and therefore the focus distance of the eyepiece lens may be reduced, thereby permitting the magnification of the finder to be higher. FA represents a distance measuring mark indicated near the center of the image plane and raised on the surface of the prism. Field mask HM indicating a finder field corresponding the H format has the largest opening, and therefore positioned near the image surface as a fixed frame. A field mask forming a field frame has a thickness in the range from from about 0.05 mm to 1 mm, and three field masks cannot be positioned in the same surface on the optical axis, and therefore should be shifted from each other. Field mask HM forming the largest opening has a large entire length for the field frame, and therefore the diopter of the field frame must be most seriously considered. The field frame is therefore preferably positioned at the position of a real image formed by the objective lens or the position nearer to the side of the eyepiece lens than indication mark FA in the center. A field frame having a larger opening area is more strictly appreciated, and therefore field mask CM having the second largest opening area is preferably positioned near to field mask HM. Field masks HM, CM and PM are positioned in the order from the eye piece lens toward the objective lens side. Although field mask PM has diopter most shifted toward the positive direction, the user will not have a feeling of inconsistency, because the apparent viewing field in the finder is narrow.

Figure 103:
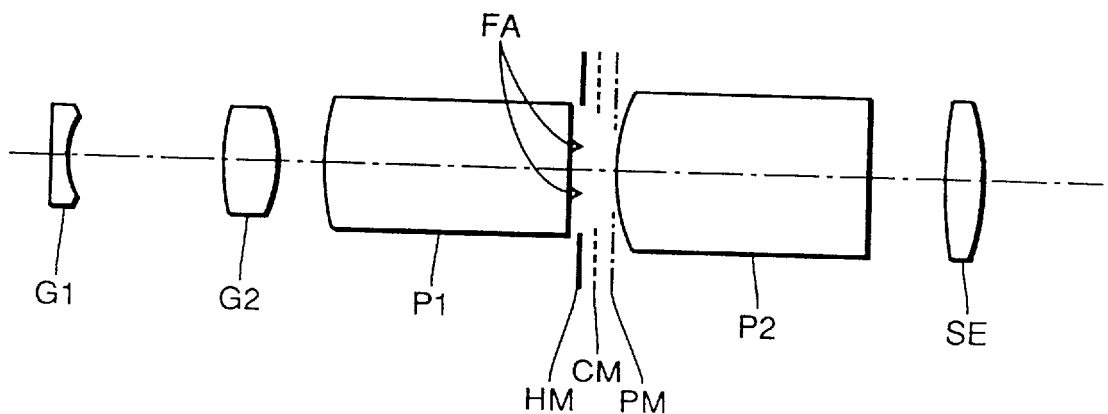
FIG. 103 is a view showing another position of the field mask in the finder according to the third embodiment.

FIG. 103 shows another placement of field masks. In FIG. 103, a real image formed by the objective lens is on the surface of P1, and indication mark FA is attached on the surface of P1 on the eyepiece lens side (exit surface). Thus placing the real image surface on P1 reduces the lens back of the objective lens, and the structure of the objective lens may be more flexible and applicable to a zoom finder of higher magnifications. Field masks HM, CM and PM are placed in the order from the objective lens side and field mask HM is positioned nearer to the eyepiece lens side than indication mark. Although field mask PM is most shifted toward the negative direction in diopter, the user will not have a feeling of inconsistency very much, because the apparent viewing field in the finder is narrow.

Figure 104:
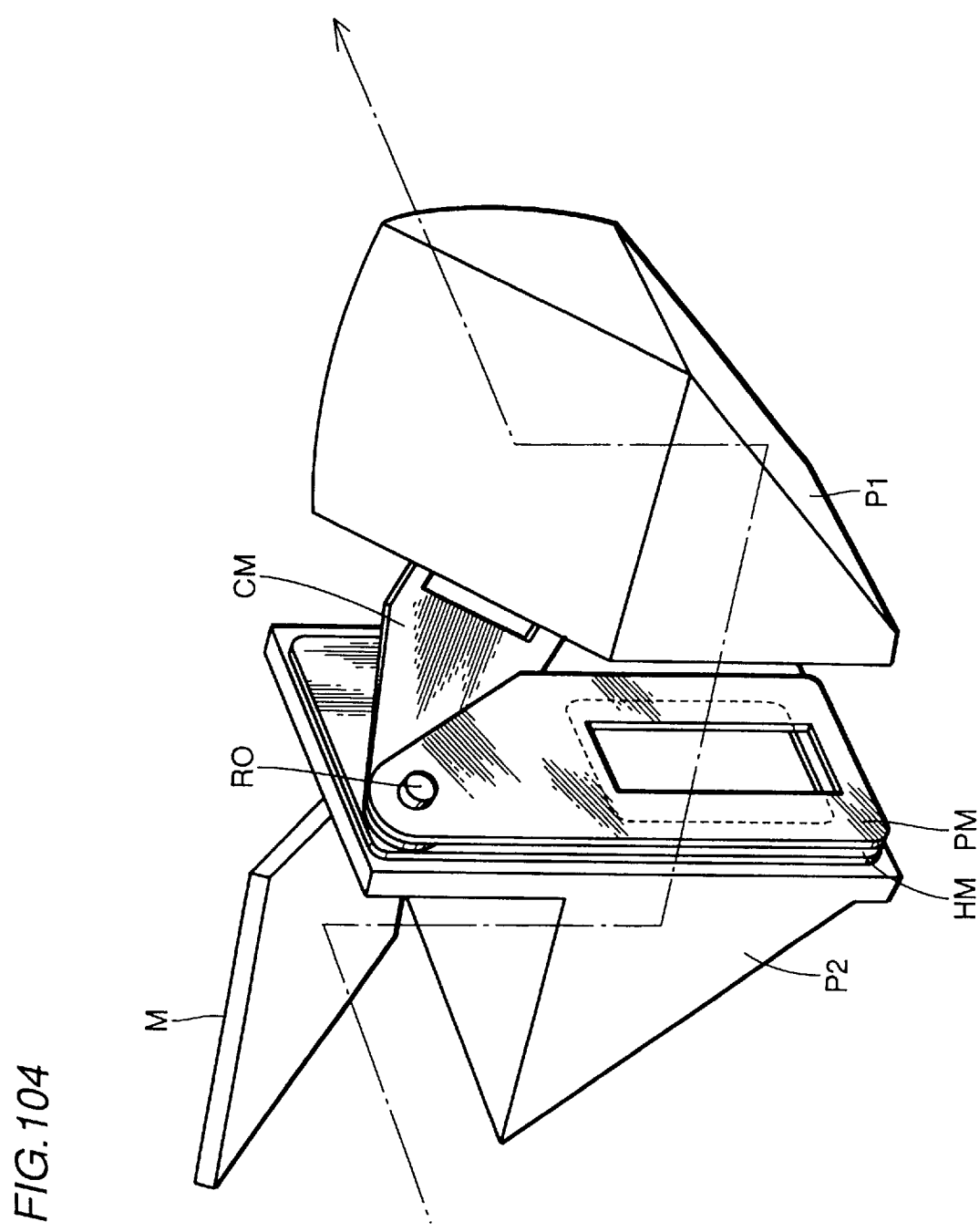
FIG. 104 is a view showing the prism and field mask of the finder according to the third embodiments.

FIG. 104 shows the structures of a prism and a field mask. On the eyepiece lens side, one of the surfaces is formed of a reflective mirror (M). The rotating shaft RO of the field mask is integrally formed with P2, and the field mask is switchable by rotation.

Figure 105:
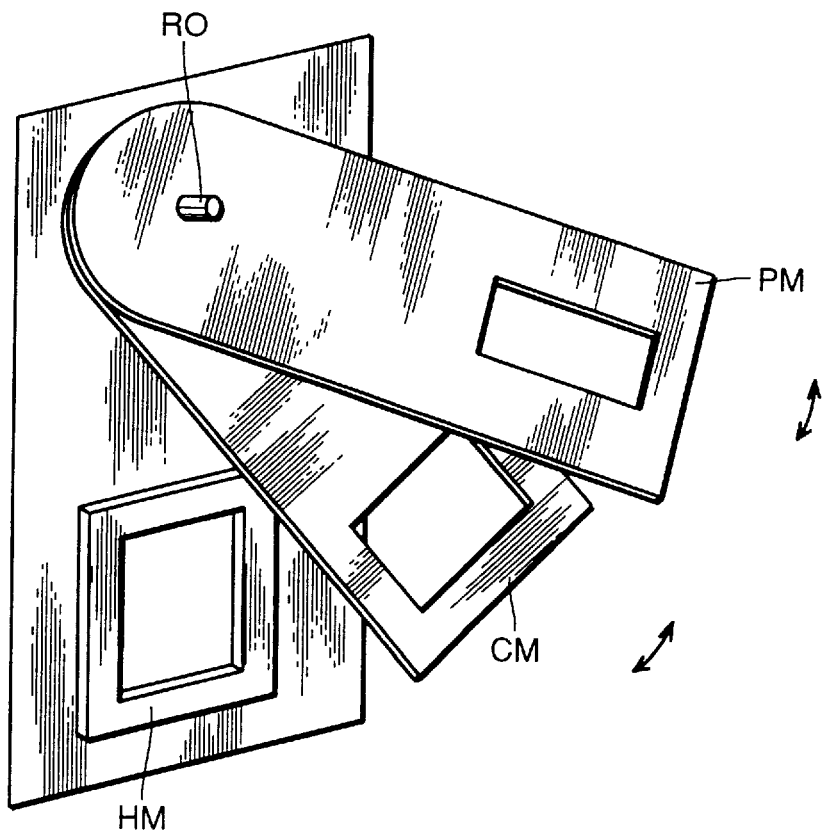
FIG. 105 is a view showing in detail the structure of the field mask of the finder according to the third embodiment.

FIG. 105 shows in detail the field mask portion in FIG. 104. Field mask HM is fixed to the prism, and field masks CM and PM can be switched by rotation around rotating shaft RO. If the H format is selected, CM and PM are withdrawn, while the C format is selected, CM rotates around rotating shaft RO to enter into the optical path of the finder, with the PM being withdrawn outside the optical path of the finder. If the P format is selected, PM comes into the optical path of the finder, with CM being withdrawn outside the optical path of the finder. The positions at which the field masks come into the optical path of the finder are arranged in the order of HM, CM and PM. In FIG. 105, the field masks are rotated and switched, but a mask may be moved in parallel to switch a field frame.

The structure of a camera incorporating a finder according to the third embodiment is identical to that of the first embodiment, with a detailed description thereof being omitted.

(4) Fourth Embodiment

Now, a fourth embodiment of the invention will be described. In the fourth embodiment, the formats are the same as those in the first to third embodiments.

Finder fields corresponding to the formats in the fourth embodiment are the same as those in FIGS. 100A to 100C illustrating the third embodiment, and therefore a detailed description will not be provided.

The structure of a real image type finder according to the fourth embodiment is the same as that shown in FIG. 93 related to the second embodiment, and therefore a detailed description thereof will not be provided here.

Figure 106:
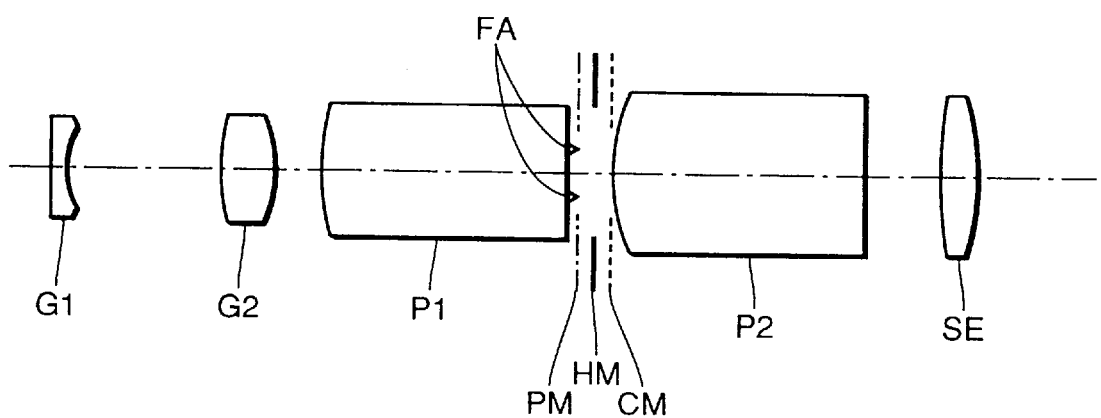
FIG. 106 is a view showing a position of a field mask in a finder according to a fourth embodiment of the invention.

FIG. 106 shows a specific placement of field masks in the fourth embodiment. G1 and G2 show a group of objective lenses, and P1 and P show prisms of an inverting system as developed. In general, a real image by an objective lens forms on the surface of P1 on the side of an eyepiece lens, on the surface of P2 on the side of the objective lens, or on an intermediate position between P1 and P2. In this embodiment, a real image surface is designed to be formed by the objective lens on the surface of P1, and the surface of P1 on the side of the eyepiece lens is projected for indication. A distance measuring area FA as indication is formed near the center of the image plane. Field mask HM having the largest opening is positioned near the real image surface as a fixed plane. A mask forming a field frame has a thickness in the range from 0.05 mm to 1 mm, and three field masks cannot be placed on the same plane. Field mask HM having the largest opening may share part of the opening with field masks CM and PM, and therefore with field mask HM being fixed, field masks CM and PM may be preferably movable to switch the finder field. The lengthwise side of the C format and the shorter side of the P format may use the sides of field mask HM.

When the finder field is switched between these three kinds of finder fields, they must be placed close to each other. The field mask which should be formed thin is easy to yield. Therefore, if two movable field masks are placed close to each other, a yielded mask may touch and hook another mask to cause malfunction. Therefore, the two movable masks (CM, PM) are positioned opposite to each other with fixed mask (HM) therebetween to alleviate erroneous operations. Field mask CM having an opening area larger than field mask PM must look clearer than field mask PM. Human eyes have a higher adjusting ability for an image on a nearer side (a side with nearer diopter) and therefore field mask CM is preferably positioned nearer to the side of eyepiece lens on the optical axis than field mask PM. Positioning the field mask on the side of closer diopter is equivalent to positioning the field mask nearer to the side of the eyepiece lens on the optical axis.

The structures of the prisms and field masks in the fourth embodiment are the same as those shown in FIG. 104 in relation to the third embodiment, and the details of the field mask portion are the same as those in FIG. 105 in relation to the third embodiment, with a detailed description thereof being omitted.

Figure 107:
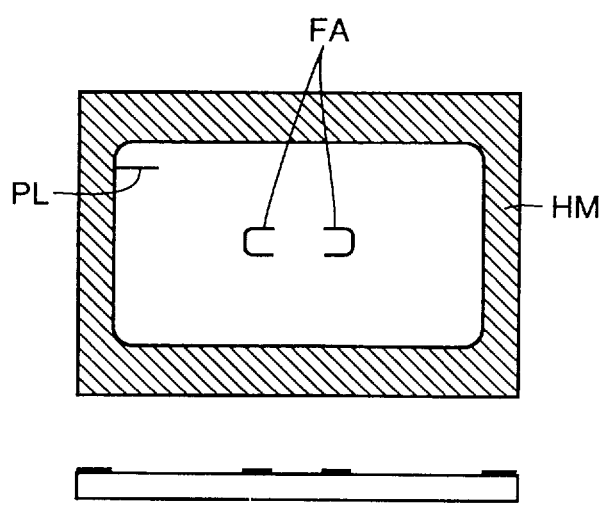
FIG. 107 is a view showing a variation of a field mask HM of the finder according to the fourth embodiment.

FIG. 107 shows a variation of field mask HM. If a real image by the objective lens may be formed on the surface of P1 or P2, the prism may be partly raised to permit indication within the image plane as stated. If, however, a real image by the objective lens is formed between prisms P1 and P2, a body for indication within the image plane is necessary. In this variation, field mask HM and such a body for indication within the image plane are formed of the same member. PL represents parallax at close range, and FA represents a distance measuring area mark. Field frames and indication marks are formed by depositing a metal film on the surface of a glass or transparent plastic surface. They may be formed separately from the body for indication within the image plane and integrated later, or may be directly deposited to the indication body.

Note that the construction of a camera incorporating the finder according to the fourth embodiment is the same as the foregoing embodiments, and therefore a detailed description thereof will not be provided. Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A finder capable of switching a field frame between a reference field frame and two field frames, comprising:
   a mechanical type switching mechanism for switching one field frame into and out of an optical path and
   a liquid crystal switching mechanism for switching another field frame into and out of the optical path.

2. A finder, comprising:
   a first field frame member for indicating a first field frame as a reference field frame;
   a second field frame member of a mechanical type capable of advancing/withdrawing in an optical path for indicating a second field frame smaller in area than said first field frame; and
   a third field frame member of a liquid crystal type fixed in the optical path for indicating a third field frame having a transverse size smaller than said first and second field frames.

3. A camera including an optics for photographing an image of an object on a recording medium and a finder for viewing said image of object, wherein
   the photographing format of said optics can be switched between a first format, a second format having a lengthwise size longer than and a transverse size identical to said first format, and a third format having a lengthwise size longer than and a transverse size width shorter than said first format,
   said finder comprising,
     a first field frame member for indicating a first field frame corresponding to said first format as a reference field frame;
     a second field frame member of a mechanical type capable of advancing/withdrawing in the optical path of the finder for indicating a second field frame corresponding to said second format; and
     a third field frame member of a liquid crystal type fixed in the optical path of the finder for indicating a third field frame corresponding to said third format.

4. The finder as recited in claim 1, wherein
   said reference field frame and said two field frames include a first field frame having prescribed lengthwise and transverse sizes, a second field frame having a transverse size identical to and a lengthwise size shorter than said first field frame, and a third field frame having a lengthwise size identical to and a transverse size shorter than said first field frame.

5. The finder as recited in claim 4, wherein
   said reference field frame is said first field frame.

6. The finder as recited in claim 4, wherein
   said reference field frame is said second field frame.

7. The finder as recited in claim 4, wherein
   said reference field frame is said third field frame.

8. A finder capable of switching a field frame between a reference field frame and first and second field frames having shapes that are different from the reference field, wherein:

said first field frame being formed by a polarizing plate; and said second field frame being formed by a member other than the polarizing plate for switching into and out of an optical path.

9. A finder capable of switching a first, second and third field frames, the shapes of respective field frames are different, comprising:

a field frame display displaying said first, second and third field frames using two display mechanisms among a display mechanism displaying the field frame by a frame member of a prescribed shape, a display mechanism displaying the field frame by liquid crystal and a display mechanism displaying the field frame by a polarizing plate.

10. A photographing apparatus having a finder observing an object to be photographed, comprising:

photographing field switching device switching the photographing field; and a field frame switching mechanism switching a field frame display in the finder to show a scope corresponding to the photographing field according to switching of said photographing field; wherein, said field frame switching mechanism having a mechanism for switching the field frame display by a frame member of a prescribed shape and a mechanism for switching the field frame display by a liquid crystal.

11. The finder as recited in claim 8, wherein said member comprises a mechanical type switching mechanism for switching into and out of an optical path.

12. The finder as recited in claim 8, wherein said member comprises a liquid crystal switching mechanism for switching into and out of the optical path.

* * * * *